US012585859B2

(12) United States Patent
Fesbinder et al.

(10) Patent No.: US 12,585,859 B2
(45) Date of Patent: Mar. 24, 2026

(54) SYSTEM AND METHOD FOR IMPROVING THE CLARITY OF OVERLAPPING OBJECTS

(71) Applicant: Read Twogether Ltd., Jerusalem (IL)

(72) Inventors: David Allen Fesbinder, Jerusalem (IL); Alexander Postnikov, Cambridge, MA (US); Shmuel Ur, Shorashim (IL)

( * ) Notice: Subject to any disclaimer, the term of this patent is extended or adjusted under 35 U.S.C. 154(b) by 0 days.

(21) Appl. No.: 19/011,578

(22) Filed: Jan. 6, 2025

(65) Prior Publication Data

US 2025/0181818 A1 Jun. 5, 2025

Related U.S. Application Data

(63) Continuation-in-part of application No. 18/815,510, filed on Aug. 26, 2024, now Pat. No. 12,229,492, which is a continuation-in-part of application No. 18/732,461, filed on Jun. 3, 2024, application No. 19/011,578 is a continuation-in-part of application No. 18/316,213, filed on May 11, 2023, now Pat. No. 12,190,042, said application No. 18/732,461 is a continuation-in-part of application No. 18/062,503, filed on Dec. 6, 2022, now Pat. No. 12,001,507, said application No. 18/316,213 is a continuation-in-part of application No. 17/827,649, filed on May 27, 2022, now Pat. No. 11,720,740.

(60) Provisional application No. 63/373,282, filed on Aug. 23, 2022, provisional application No. 63/350,636, filed on Jun. 9, 2022, provisional application No. 63/286,378, filed on Dec. 6, 2021.

(51) Int. Cl.
*G06F 17/00* (2019.01)
*G06F 9/451* (2018.01)
*G06F 40/106* (2020.01)

(52) U.S. Cl.
CPC ............ *G06F 40/106* (2020.01); *G06F 9/451* (2018.02)

(58) Field of Classification Search
CPC ........ G06F 40/106; G06F 9/451; G06F 16/34; G06F 16/38; G06F 3/04847; G06F 3/0482
USPC ........................................................ 715/234
See application file for complete search history.

(56) References Cited

U.S. PATENT DOCUMENTS

| | | | |
|---|---|---|---|
| 5,255,357 | A | 10/1993 | Byron |
| 5,494,444 | A | 2/1996 | Thayer |
| 5,706,364 | A | 1/1998 | Kopec |
| 5,803,629 | A | 9/1998 | Neville |

(Continued)

*Primary Examiner* — Jason T Edwards
(74) *Attorney, Agent, or Firm* — Alexander Postnikov

(57) ABSTRACT

A system and method for dynamically enhancing the clarity of a text overlapping its associated content on an electronic display. Clarity scoring modules can be used to determine clarity scores for both the text and its associated content. A combined clarity score is calculated, and adaptations (e.g., repositioning, resizing, changing Style, or replacing words) are applied the text to optimize its readability. Adaptations are tailored to improve clarity without having to separate the text and its associated content, using predefined weights to prioritize recognizability. The system ensures the adapted content remains within designated display areas and accommodates complex scenarios like text placement within specific image regions. Machine learning models may suggest optimal adaptations. This method improves the legibility of text and associated content, particularly in scenarios requiring dynamic adjustments for translations or overlaid text on images.

25 Claims, 28 Drawing Sheets

402 the contents of an electronic display are received 404 text strings are identified and airspaces are defined for each text string 406 objects are identified and airspaces are defined for each object 408 an identified text string is selected for improvement 410 a combined clarity score, a clarity score the the text string, and/or a clarity score the the associated content is calculated 412 the digital image is recreated in a virtual environment 414 an adaptation is applied to the selected text string and/or its associated content 416 clarity scores are calculated for adaptations to the selected text string and/or its associated content 418 the selected text string and its associated content are rendered for display 420 the selected text string and its associated content are displayed on the electronic display

(56)                References Cited

U.S. PATENT DOCUMENTS

| | | | |
|---|---|---|---|
| 7,242,404 B2 | 7/2007 | Burago | |
| 7,286,269 B2 | 10/2007 | Matskewich | |
| 7,576,756 B1 | 8/2009 | Good | |
| 8,001,465 B2 | 8/2011 | Kudrolli | |
| 8,775,165 B1 | 7/2014 | Oikawa | |
| 10,713,417 B2 | 7/2020 | Dhanka | |
| 10,997,757 B1 | 5/2021 | Hunter | |
| 11,016,651 B1* | 5/2021 | Black | G06F 16/34 |
| 11,720,740 B2 | 8/2023 | Fesbinder | |
| 2003/0200505 A1 | 10/2003 | Evans | |
| 2004/0223645 A1 | 11/2004 | Cliff | |
| 2010/0204979 A1* | 8/2010 | Chiu | G06F 3/0481 |
| | | | 704/3 |
| 2011/0110599 A1* | 5/2011 | Sata | G06V 30/1444 |
| | | | 382/229 |
| 2011/0202836 A1 | 8/2011 | Badger | |
| 2013/0229489 A1 | 9/2013 | Ozawa | |
| 2014/0019117 A1 | 1/2014 | Ravi | |
| 2016/0070441 A1 | 3/2016 | Paek | |
| 2017/0220536 A1* | 8/2017 | Chiba | G06F 9/453 |
| 2017/0308290 A1 | 10/2017 | Patel | |
| 2017/0357640 A1 | 12/2017 | Bellegarda | |
| 2018/0240251 A1* | 8/2018 | Kitagawa | G06V 20/52 |
| 2019/0087772 A1 | 3/2019 | Medina | |
| 2020/0097715 A1 | 3/2020 | Henninger | |
| 2020/0273090 A1* | 8/2020 | Ayush | G06T 7/75 |
| 2021/0019365 A1 | 1/2021 | Mangla | |
| 2021/0027508 A1* | 1/2021 | Sharma | G06V 30/414 |
| 2021/0042381 A1 | 2/2021 | Kumawat | |
| 2021/0118207 A1 | 4/2021 | Kumawat | |
| 2022/0019735 A1* | 1/2022 | Shekhar | G06F 16/9538 |
| 2022/0301244 A1 | 9/2022 | Kumawat | |
| 2023/0061022 A1 | 3/2023 | Chang et al. | |
| 2023/0140498 A1 | 5/2023 | Jain | |
| 2023/0186013 A1 | 6/2023 | Zhang | |
| 2023/0222172 A1 | 7/2023 | Fesbinder et al. | |
| 2023/0368445 A1 | 11/2023 | Dhanuka | |

* cited by examiner primary substring
Secondary substring primary substring
Secondary substring primary substring 252                         250

254

256                    258

260

262

264                        268

266

Figure 4:
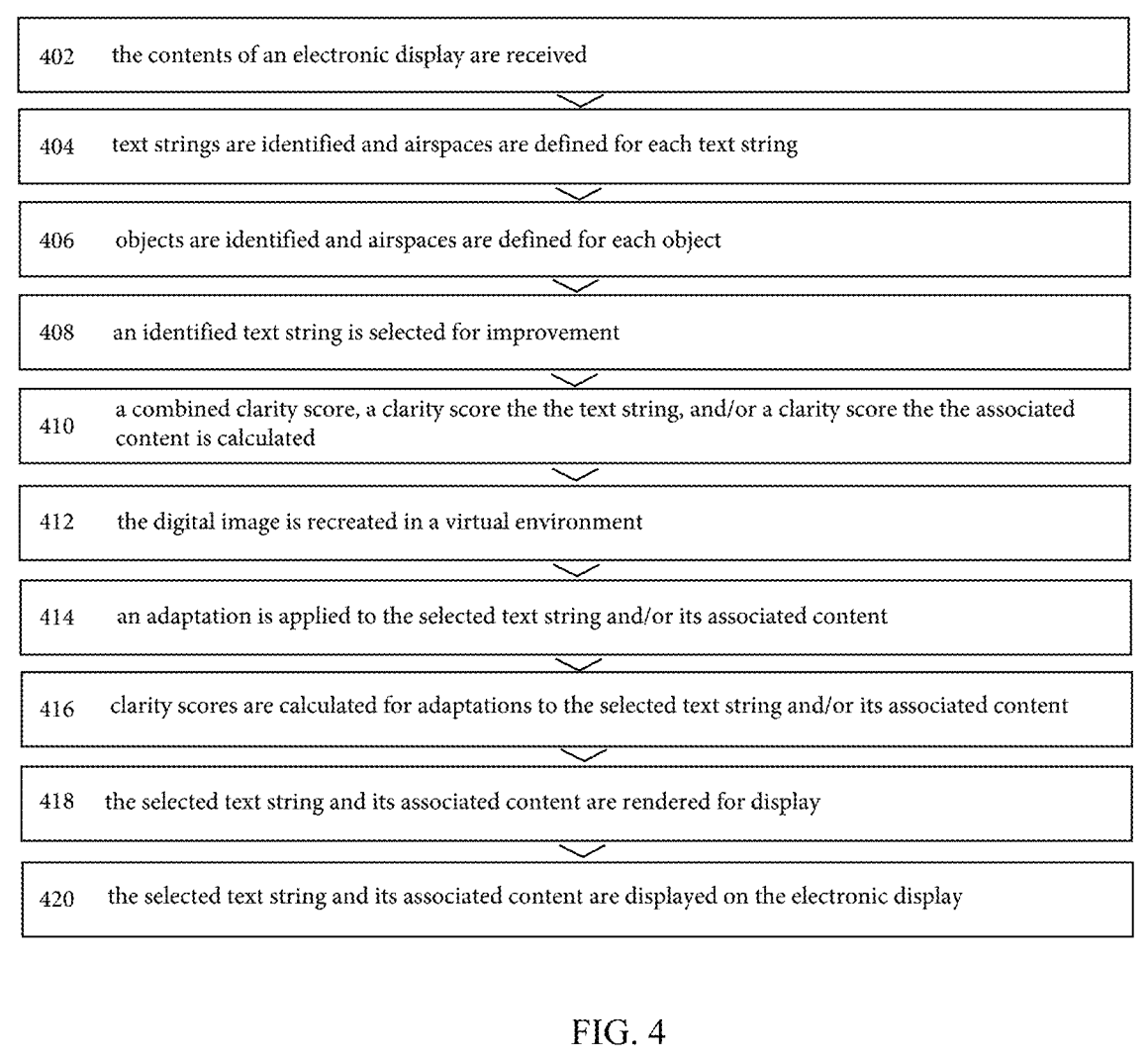

| 402 | the contents of an electronic display are received |

| 404 | text strings are identified and airspaces are defined for each text string |

| 406 | objects are identified and airspaces are defined for each object |

| 408 | an identified text string is selected for improvement |

| 410 | a combined clarity score, a clarity score the the text string, and/or a clarity score the the associated content is calculated |

| 412 | the digital image is recreated in a virtual environment |

| 414 | an adaptation is applied to the selected text string and/or its associated content |

| 416 | clarity scores are calculated for adaptations to the selected text string and/or its associated content |

| 418 | the selected text string and its associated content are rendered for display |

| 420 | the selected text string and its associated content are displayed on the electronic display |

FIG. 4 primary substring
Secondary substring

FIG. 5A primary substring
Secondary substring

FIG. 5 B primary substring
Secondary substring

FIG. 5C primary substring
Secondary substring

FIG. 5D primary substring
Secondary substring

FIG. 5E primary substring
Secondary substring

FIG. 5 F primary substring
Secondary substring

FIG. 5G primary substring
Secondary substring

FIG. 5H primary substring
Secondary substring

FIG. 5I primary substring
Secondary substring

FIG. 5J primary substring
Secondary substring

FIG. 5K

*primary substring*
Secondary substring

FIG. 5L primary substring
Secondary substring

FIG. 5M primary substring
Secondary substring

FIG. 5N primary substring
Secondary substring

FIG. 5O main substring
Secondary substring

FIG. 5 P text text text text text text text text text text text text
text text text text text text text text text text text text
text text text text text text text text text text text text
text text text text text text primary substring
secondary substring text text text text text text
text text text text text text text text text text text text
text text text text text text text text text text text text
text text text text text text text text text text text text

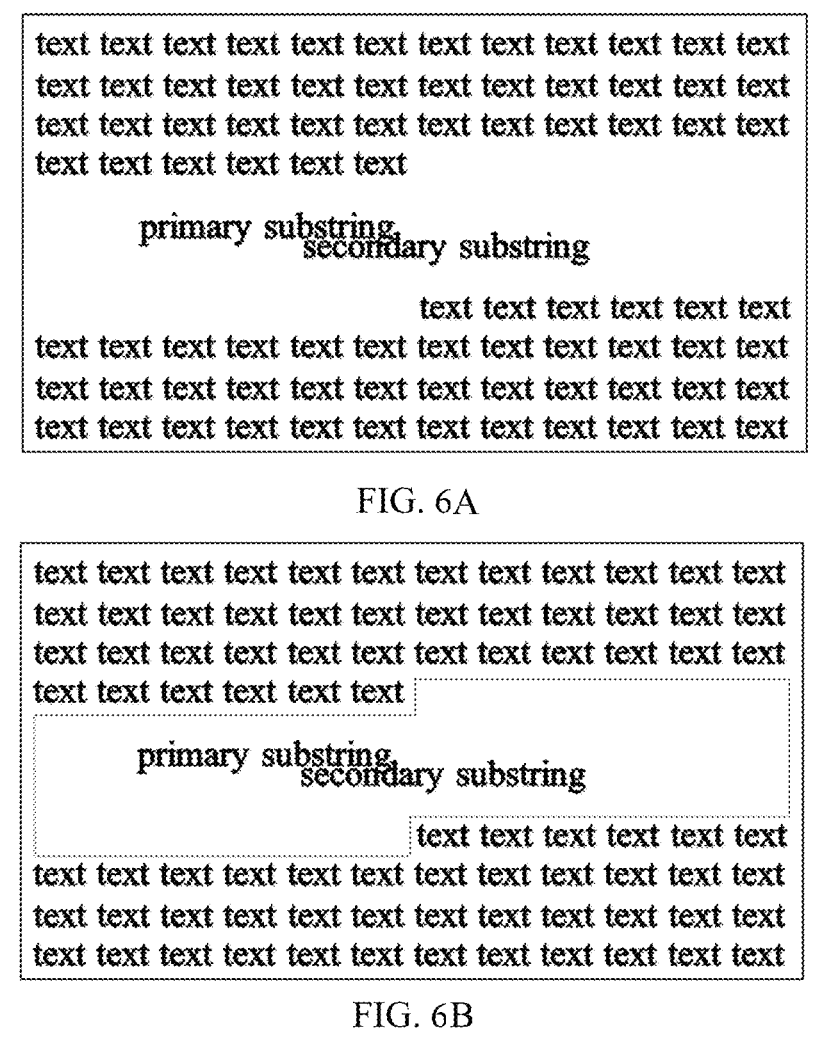

FIG. 6A text text text text text text text text text text text text
text text text text text text text text text text text text
text text text text text text text text text text text text
text text text text text text primary substring
secondary substring text text text text text text
text text text text text text text text text text text text
text text text text text text text text text text text text
text text text text text text text text text text text text

FIG. 6B

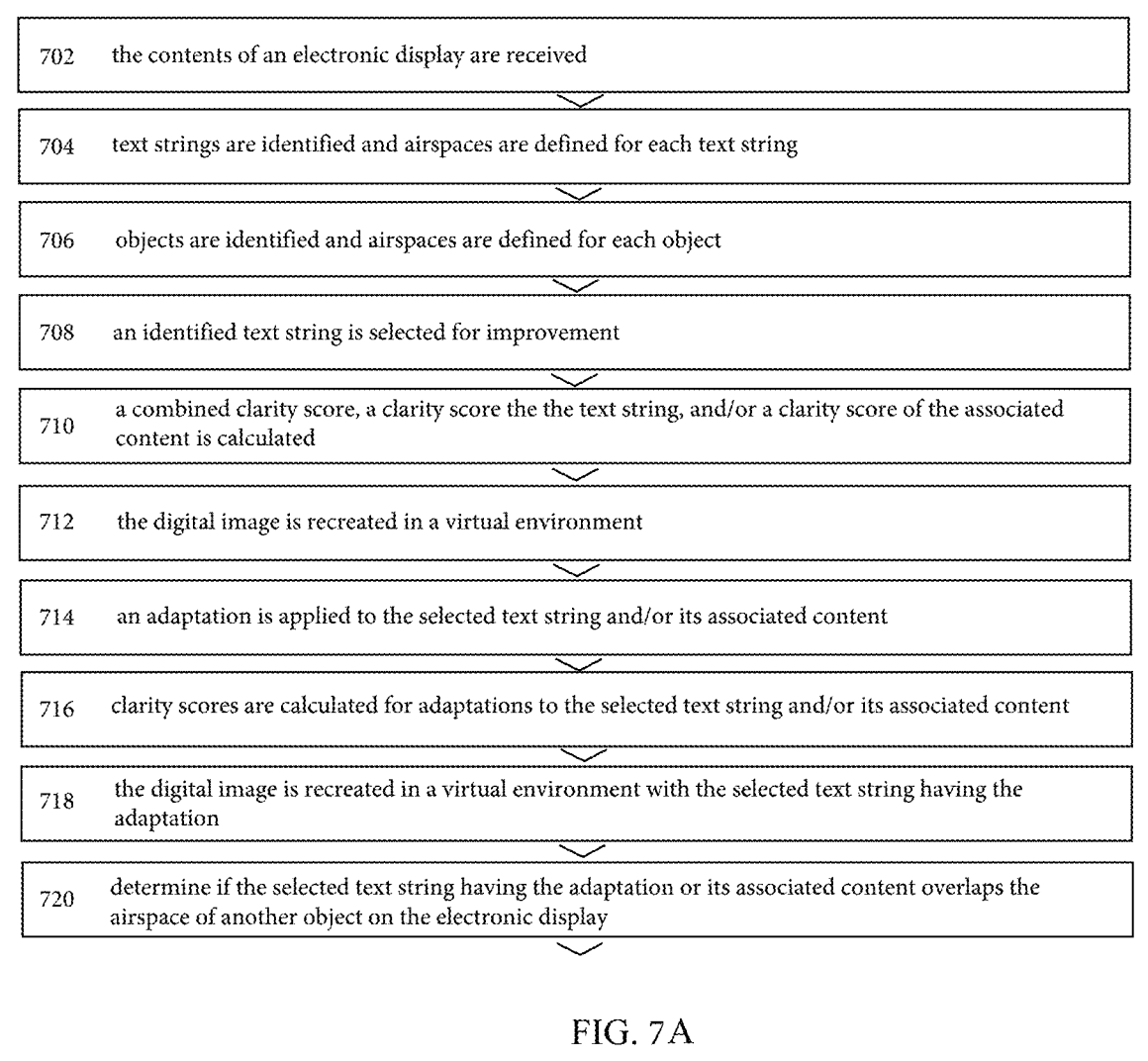

| 702 | the contents of an electronic display are received |
|---|---|

| 704 | text strings are identified and airspaces are defined for each text string |
|---|---|

| 706 | objects are identified and airspaces are defined for each object |
|---|---|

| 708 | an identified text string is selected for improvement |
|---|---|

| 710 | a combined clarity score, a clarity score the the text string, and/or a clarity score of the associated content is calculated |
|---|---|

| 712 | the digital image is recreated in a virtual environment |
|---|---|

| 714 | an adaptation is applied to the selected text string and/or its associated content |
|---|---|

| 716 | clarity scores are calculated for adaptations to the selected text string and/or its associated content |
|---|---|

| 718 | the digital image is recreated in a virtual environment with the selected text string having the adaptation |
|---|---|

| 720 | determine if the selected text string having the adaptation or its associated content overlaps the airspace of another object on the electronic display |
|---|---|

FIG. 7A

Figure 7B:
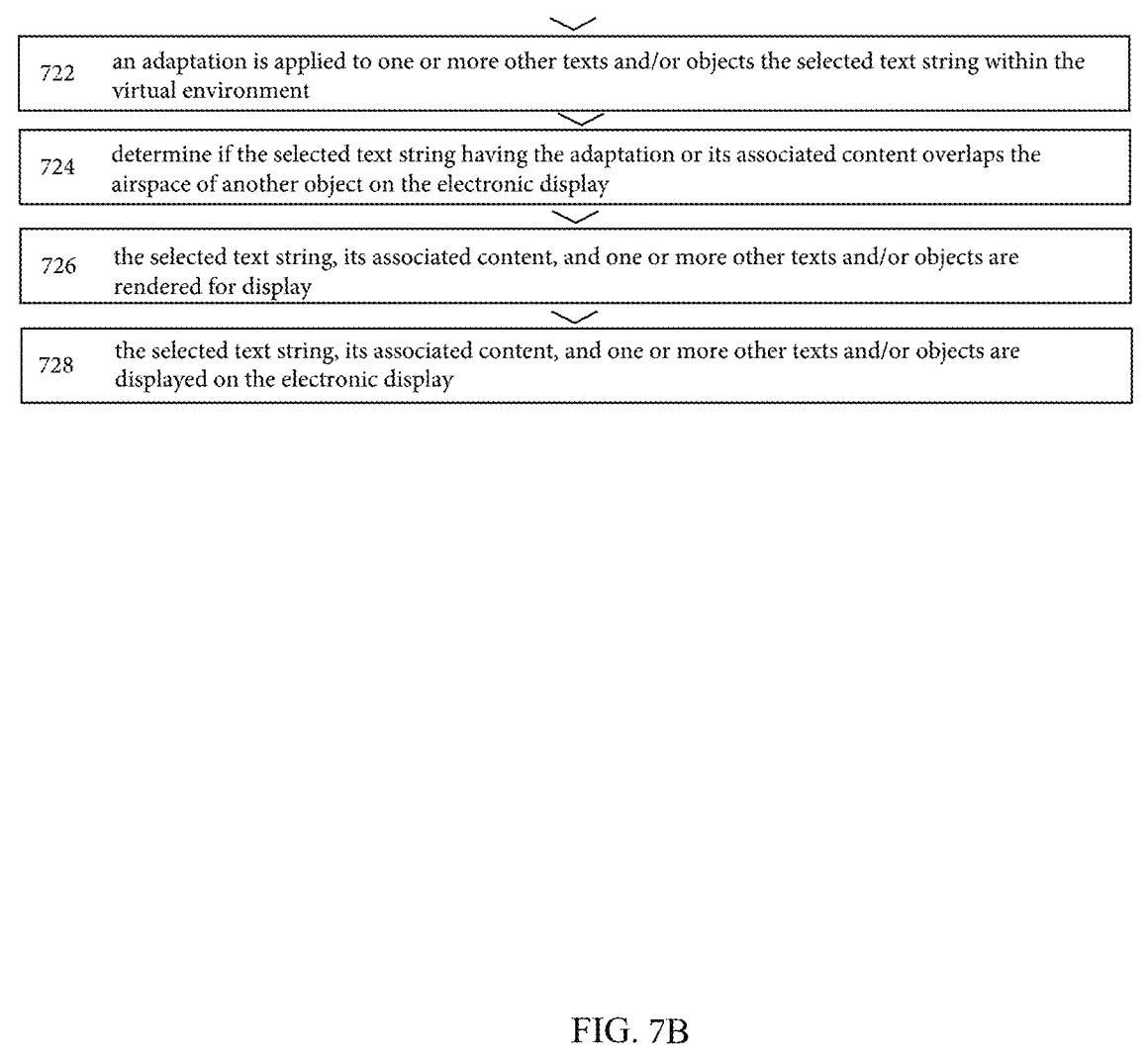

| 722 | an adaptation is applied to one or more other texts and/or objects the selected text string within the virtual environment |

| 724 | determine if the selected text string having the adaptation or its associated content overlaps the airspace of another object on the electronic display |

| 726 | the selected text string, its associated content, and one or more other texts and/or objects are rendered for display |

| 728 | the selected text string, its associated content, and one or more other texts and/or objects are displayed on the electronic display |

FIG. 7B text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text

FIG. 8A text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text

FIG. 8B text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text

FIG. 9A text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text
text text text text text text text text text text text text

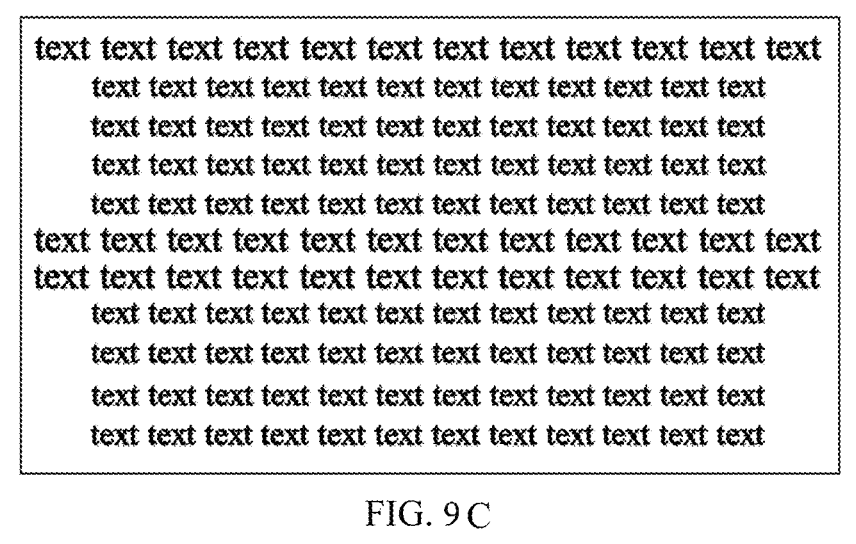

FIG. 9B text text text text text text text text text text text text
text text text text text text text text text text text
text text text text text text text text text text text text
text text text text text text text text text text text text
text text text text text text text text text text text
text text text text text text text text text text text text
text text text text text text text text text text text text
text text text text text text text text text text text
text text text text text text text text text text text
text text text text text text text text text text text
text text text text text text text text text text text text

FIG. 9 C

| I am learning | Spanish | before I travel | to Spain |
|---|---|---|---|
| Estoy aprendiendo | español | antes de viajar | a España |
| | a | b | a |

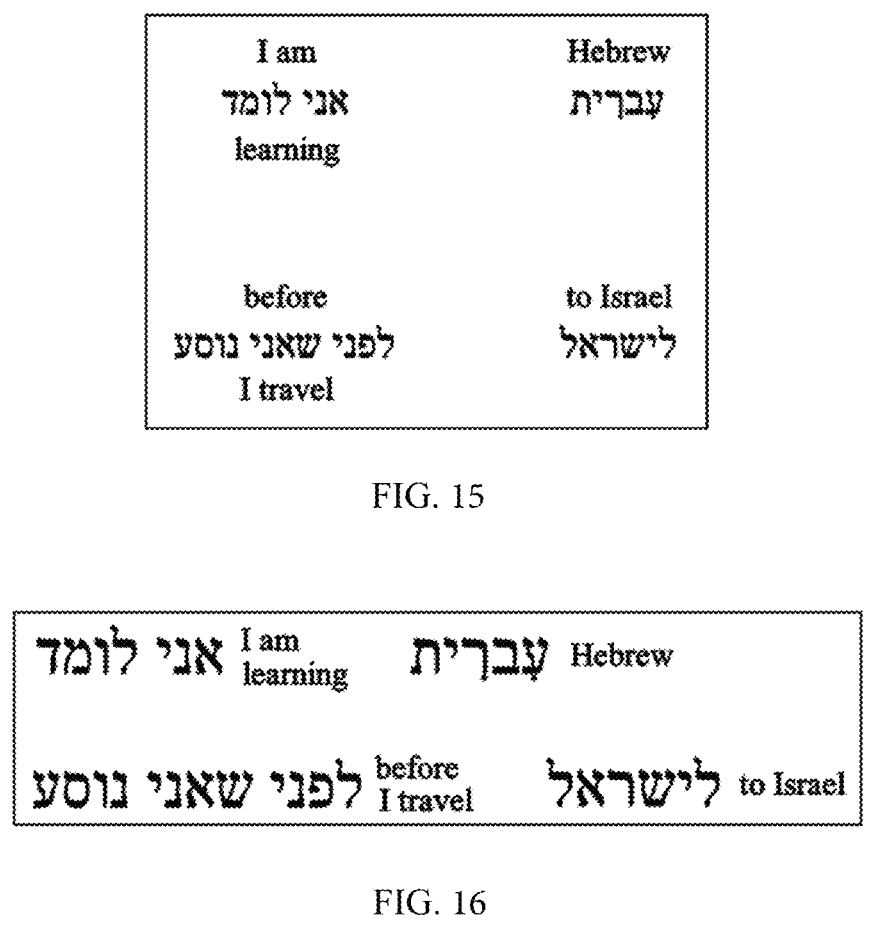

I am

אני לומד learning

Hebrew

עִבְרִית before

לפני שאני נוסע

I travel to Israel

אני לומד I am learning     עִבְרִית Hebrew

לפני שאני נוסע before I travel     לישראל to Israel

FIG. 16

1802    a text string comprised of at least ten substrings is received 1804    a translation is received for each of the substrings 1806    the substrings and their corresponding translations are arranged into substring pairs 1808    the substring pairs are rendered for display 1810    the rendered substring pairs are displayed on an electronic display

FIG. 18

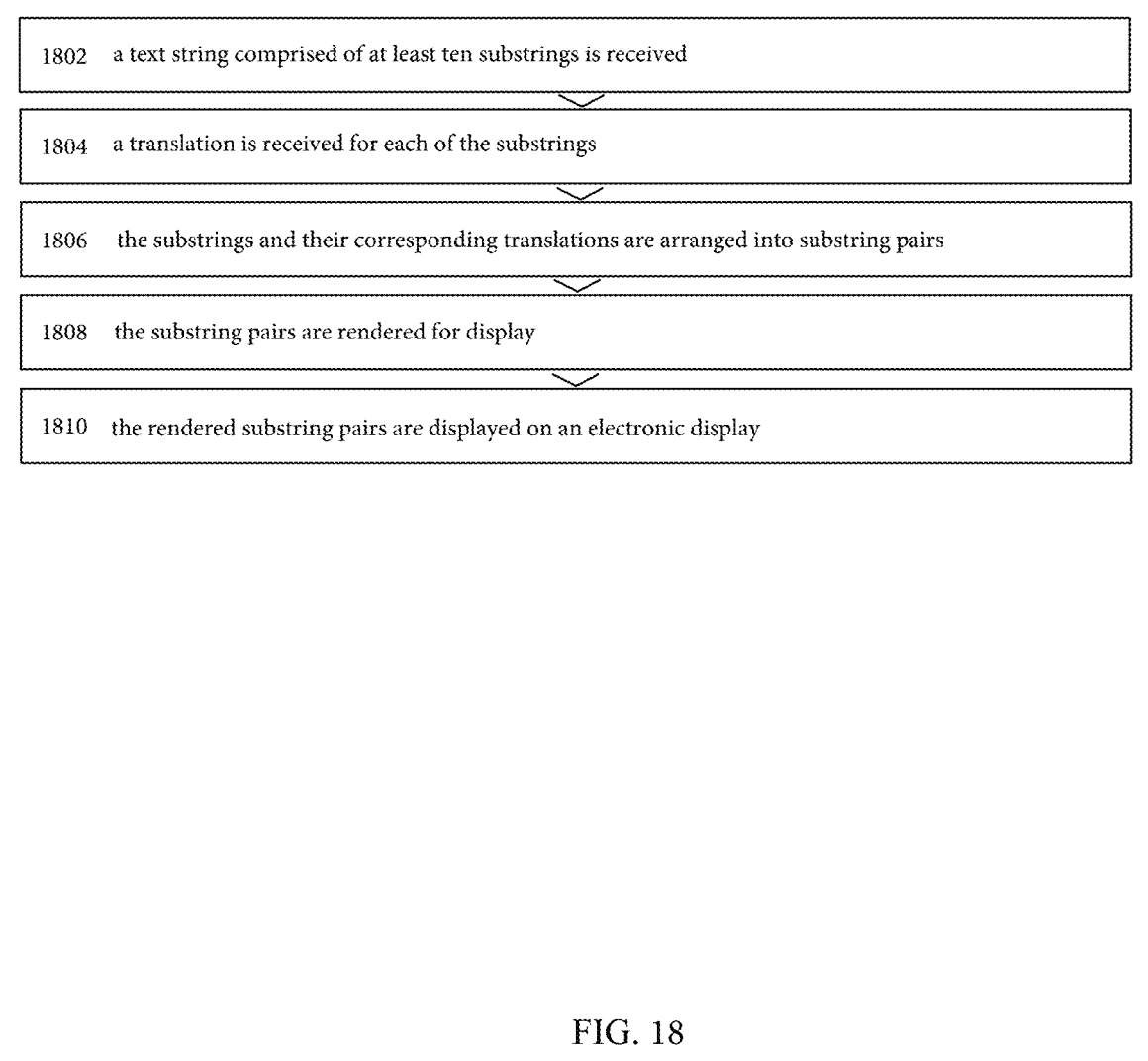

SYSTEM AND METHOD FOR IMPROVING THE CLARITY OF OVERLAPPING OBJECTS

This patent is a continuation-in-part of U.S. patent application Ser. No. 18/316,213, "REDUCING INTERFERENCE BETWEEN TWO TEXTS", filed on Mar. 11, 2023, now U.S. Pat. No. 12,190,042, issued on Jan. 7, 2025, said application incorporated herein by reference in its entirety. U.S. patent application Ser. No. 18/316,213 is a continuation-in-part of U.S. patent application Ser. No. 17/827,649, "REDUCING INTERFERENCE BETWEEN TWO TEXTS", filed on May 27, 2022, now U.S. Pat. No. 11,720, 740, issued on Aug. 8, 2023, said application incorporated herein by reference in its entirety. U.S. patent application Ser. No. 17/827,649 claims priority to U.S. Provisional Patent Application 63/286,378, "DISPLAY OF TEXTS", filed on Dec. 6, 2021, said application incorporated herein by reference in its entirety. U.S. patent application Ser. No. 17/827,649 also claims priority to U.S. Provisional Patent Application 63/373,282, "DEFINING SUBSTRUCTURES AND SUPERSTRUCTURES OF A TEXT STRING", filed on Aug. 23, 2022, said application incorporated herein by reference in its entirety.

This patent is a continuation-in-part of U.S. patent application Ser. No. 18/815,510, "Alternating Positioning of Primary Text", filed on Aug. 26, 2024, said application incorporated herein by reference in its entirety. U.S. patent application Ser. No. 18/815,510 is a continuation-in-part of U.S. patent application Ser. No. 18/732,461, "DISPLAY OF TEXTS", filed on Jun. 3, 2024, said application incorporated herein by reference in its entirety. U.S. patent application Ser. No. 18/732,461 is a continuation-in-part of U.S. patent application Ser. No. 18/062,503, "DEMARCATION OF TEXTS", filed on Dec. 6, 2022, now U.S. Pat. No. 12,001, 507, issued on Jun. 4, 2024, said application incorporated herein by reference in its entirety. U.S. patent application Ser. No. 18/062,503 claims priority to two US Provisional Patent Applications, U.S. Provisional Patent Application 63/286,378, "DISPLAY OF TEXTS", filed on Dec. 6, 2021, and U.S. Provisional Patent Application 63/350,636, "Comparative Text Display Systems and Methods", filed on Jun. 9, 2022, both provisional patent application incorporated herein by reference in their entirety.

BACKGROUND

The present disclosure relates to the field of displaying objects, and, in particular, to the field of improving the clarity of overlapping objects on an electronic display.

SCOPE OF PRIOR ART

The terms used to describe the prior art are listed at the start of the detailed description. The prior art focuses on improving the visibility of individual objects or text strings but lacks integrated solutions for dynamically optimizing the clarity of overlapping elements while maintaining their intentional design relationships.

SUMMARY

The present disclosure satisfies the foregoing needs by providing, inter alia, systems and methos for improving the clarity of overlapping objects.

One aspect of the present invention is directed to a method and system for improving the clarity of overlapping objects. This method optimizes the recognizability of both the text string and its associated content by calculating a combined clarity score, which evaluates the visibility of both elements using character or image recognition techniques. Based on this score, the method identifies and applies adaptations to improve clarity without eliminating the overlap between the text and the associated content.

The process involves receiving a text string and associated content that occupy overlapping spaces on a display. A combined clarity score is determined, factoring in individual clarity scores for the text string and the associated content. Adaptations are then applied to enhance clarity, including adjustments to the position, Style, word replacements, or dimensions (e.g., height or width) of the text string. For example, the y-position of the text string may be shifted, words may be replaced with synonyms, or the proportions of the text may be modified, all while maintaining the overlap with the associated content. In cases where the text overlaps an image, similar adjustments, such as shifting positions or resizing text, are made to ensure legibility without removing the overlap.

The clarity optimization is guided by a weighted formula for the combined clarity score, where the relative importance of text and associated content clarity is customizable. Machine learning models can also be employed to identify effective adaptations based on historical data. Importantly, the adapted text and content remain within a designated display area, ensuring spatial and stylistic integrity while improving overall recognizability.

This invention is particularly useful in applications such as displaying multilingual text, subtitles over images, or other overlapping visual elements. By focusing on enhancing clarity while preserving overlap, the method delivers a visually accessible and user-friendly experience.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where:

FIG. 4 is a flowchart showing steps of displaying a text string and associated content, according to an embodiment.

FIG. 5A to FIG. 5P show various adaptations to the text, according to an embodiment.

FIG. 6A to FIG. 6B shows a designated area around a selected text and its associated content.

FIG. 7A to FIG. 7B are a flowchart showing steps of displaying a text string and associated content, according to an embodiment.

FIG. 8A to FIG. 8B show a size-increasing adaptation to the selected text string and a size-reducing adaption to other text, according to an embodiment.

FIG. 8A to FIG. 8B show a size-increasing adaptation to the selected text string and a size-reducing adaption to other text in designated areas, according to an embodiment.

Figures 9A, 9B:
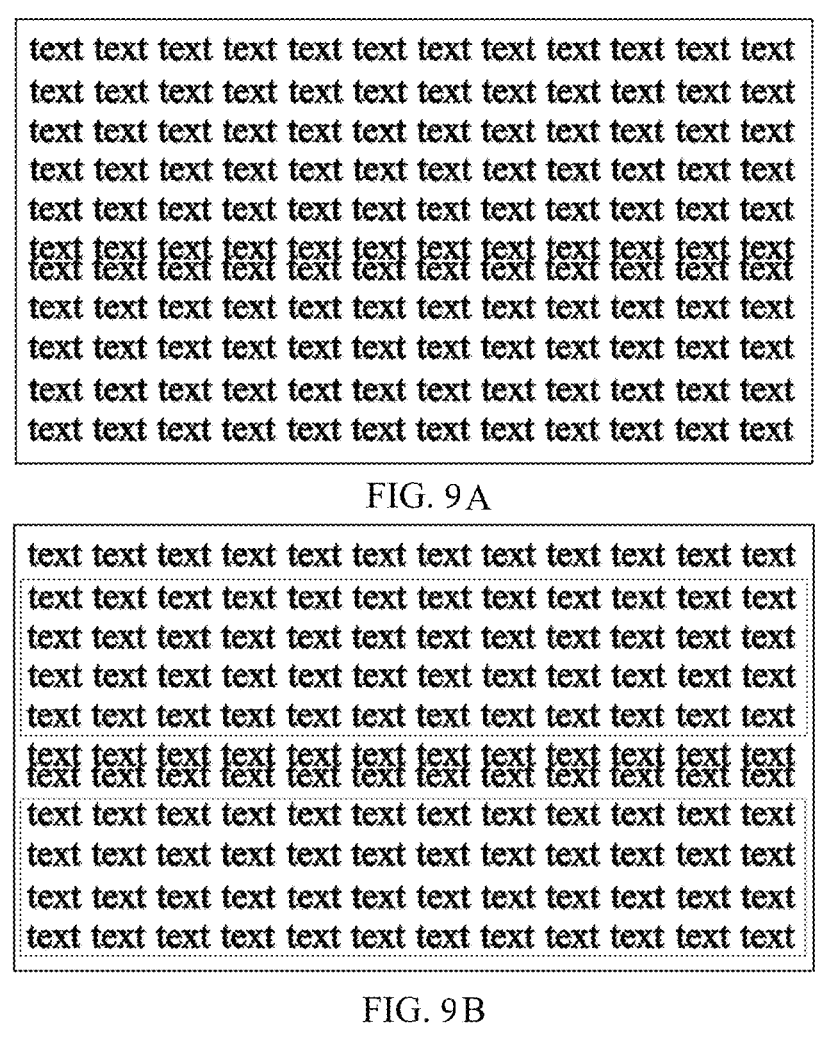

FIG. 9A to FIG. 9C show size-reducing adaptations applied to other text in designated areas of the electronic display.

FIG. 15 shows substring pairs, according to an embodiment.

FIG. 16 shows substring pairs, according to an embodiment.

FIG. 18 is a flowchart showing steps of displaying text strings received by a computing device, according to an embodiment.

DETAILED DESCRIPTION

The disclosed approaches may be provided in a variety of manners, for example, procedural, computer implement, integrated into a system or apparatus, provided as a computer programming product, and the like.

Figures 1A, 1B, 1C:
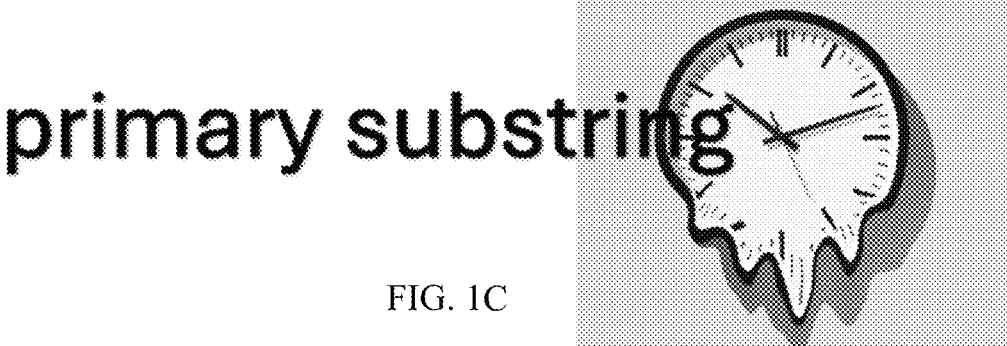
FIG. 1A shows a text string overlapping the airspace of another text string.
FIG. 1B shows a text string overlapping the body of another text string.
FIG. 1C shows a text string overlapping an object in an image.

FIG. 1A shows a text string overlapping the airspace of another text string. Here, the primary substring is overlapping the airspace (illustrated by the grey box) of the secondary substring.

FIG. 1B shows a text string overlapping the body of another text string. Here, the primary substring is overlapping the body of the secondary substring.

FIG. 1C shows a text string overlapping an object in an image. Here, the primary substring overlaps a clock in an image (the clock is the object).

Figure 2A:
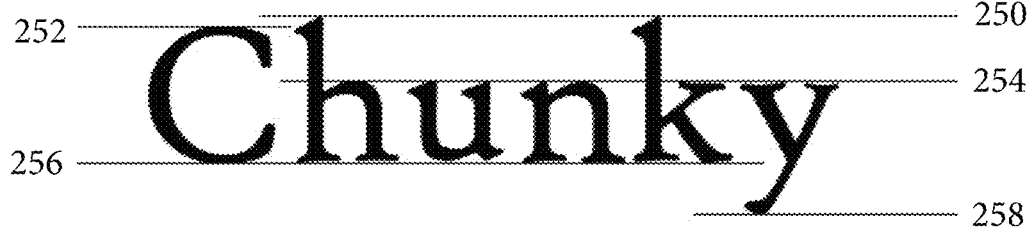
FIG. 2A to FIG. 2E show definitions used throughout the disclosure.
Figure 2B:
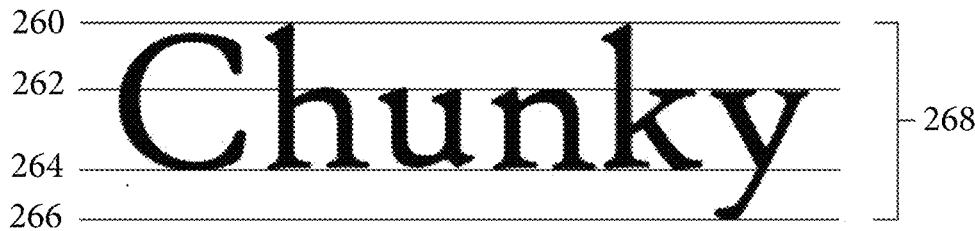
Figure 2:

For the sake of convenience, the terms used to describe the prior art and various embodiments of the present invention are defined below. Some terms are illustrated in FIG. 2A to FIG. 2C for further clarification.

Display (verb): The verb "display," unless specified otherwise, refers to the act of presenting text and/or objects in any format that may be perceived by a viewer of the text and/or objects, for example, but not limited to, presenting text and/or objects on digital screens, printed medium, as holographs, and the like.

Display (noun): The noun "display," unless specified otherwise, refers to any sort of presentation text and/or objects that may be perceived by a viewer of the text and/or objects, for example, but not limited to, a presentation of the text and/or objects on digital screens, printed medium, as holographs, and the like.

Bordering: A text or object borders another text or object when an edge of the text or object is flush with the edge of the other text or object.

Overlapping: A text or object overlaps another text or object when the body of the text or object occupies the same space as the body of the other text or object.

Superimposing: A first text or object superimposes another text or object when only one of the texts or objects is visible in any overlapping portions.

Text (or text string): A string of at least one character. It should be appreciated that while the term 'text string' has been exemplified in the instant disclosure in the form of a text, it could be any other form/representation of a string, for instance, of one or more numbers, alphanumeric representations, codes, written expressions, graphical symbols, or a combination thereof. This non-limiting definition of 'text' and scope thereof is therefore applicable to methods described herein.

Ascender height 250: The height of the ascenders, considered characteristic of a given typeface, font, or script. As illustrated in FIG. 2A, the ascender height of "Chunky" would be the height of the topmost points of the "h" and "k." The ascender height is sometimes referred to throughout the detailed description as the topmost point of a text in cases where the ascender height of a text is greater than or equal to the cap height of a text.

Ascender line: A horizontal line at the ascender height of a given typeface, font, or script.

Cap height 252: The height of capital letters, considered characteristic of a given typeface, font, or script. As illustrated in FIG. 2A, the cap height of "Chunky" would be the height of the topmost point of the "C." The cap height is sometimes referred to throughout the detailed description as the topmost point of a text in cases where the cap height of a text is greater than or equal to the ascender height of a text.

Cap line: A horizontal line at the cap height of a given typeface, font, or script.

X-height 254: The height of a lower-case x, considered characteristic of a given typeface, font, or script. As illustrated in FIG. 2A, the x-height of "Chunky" would be the height of the topmost points of the "u," "n," and "y." It shall be appreciated that for typefaces that do not employ Latin characters, such as Hebrew, an equivalent mean-height concept is applicable.

X-height line: A horizonal line at the x-height of a given typeface, font, or script. It shall be appreciated that for typefaces that do not employ Latin characters, such as Hebrew, an equivalent mean-line concept is applicable.

Base height 256: The height of the base of most letters of a given typeface, font, or script, typically set to 0. As illustrated in FIG. 2A, the base height of "Chunky" would be the height of the bottommost points of the "C," "h," "u," "n," and "k."

Base line: A horizonal line at the base height of a given typeface, font, or script.

Descender height 258: The height of the descenders, considered characteristic of a given typeface, font, or script. As illustrated in FIG. 2A, the descender height of "Chunky" would be the height of the bottommost point of the "y." The descender height is sometimes referred to throughout the description as the bottommost point of a text.

Descender line: A horizontal line at the descender height of a given typeface, font, or script.

Text ceiling 260: The typical position of the topmost points of a text, considered characteristic of a given typeface, font, or script. As illustrated in FIG. 2B, the text ceiling of the characters in "Chunky" is the position of topmost points of the "h," and "k."

Text x-height 262: The typical position of the x-height line of a text, considered characteristic of a given typeface, font, or script. As illustrated in FIG. 2B, the text x-height of the characters in "Chunky" is near the topmost points of the "u," "n," and "y." It shall be appreciated that for typefaces that do not employ Latin characters, such as Hebrew, an equivalent text mean-height concept is applicable.

Text base line 264: The typical position of the base line of a text, considered characteristic of a given typeface, font, or script. As illustrated in FIG. 2B, the text base line the characters in "Chunky" is near the bottommost points of the "C," "h," "u," "n," "k", and "v."

Text floor 266: The typical position of the bottommost points of a text, considered characteristic of a given typeface, font, or script. As illustrated in FIG. 2B, the text floor of the characters in "Chunky" is the position of the bottommost point of the "y."

Text height 268: The typical distance from the text floor to the text ceiling, considered characteristic of a given typeface, font, or script. As illustrated in FIG. 2B, the text height of the characters in "Chunky" is the distance from the bottommost point of "y" to the topmost points of "h" and "k."

Airspace 270: A rectangular area for each character, text string, or object, the bottom edge of the airspace bounded by a horizontal line at the bottommost point of the character, text string, or object, the top edge of the airspace bounded by a horizontal line at the topmost point of the character, text string, or object, the left edge of the airspace bounded by a vertical line at the leftmost point of the character, text string, or object, and the right edge of the airspace bounded by a vertical line at the rightmost point of the character, text string, or object. As illustrated in FIG. 2C, the airspace of the "h" in "Chunky" is highlighted with a grey reference box behind the "h."

Inner airspace 222: A rectangular area for each character, the bottom edge of the airspace bounded by the text base line, the top edge of the airspace bounded by the text x-height line, the left edge of the airspace bounded by a vertical line at the leftmost point of the character, and the right edge of the airspace bounded by a vertical line at the rightmost point of the character. As illustrated in FIG. 2C, the inner airspace of the "k" in "Chunky" is highlighted with a grey reference box behind the "k." The bottom edge of the airspace is bounded by the text base line of "k", the top edge of the airspace is bounded by the text x-height line of "k", the left edge of the airspace is bounded by a vertical line at the leftmost point of "k", and the right edge of the airspace is bounded by a vertical line at the rightmost point of "k".

Upper airspace 274: A rectangular area for each character, the bottom edge of the airspace bounded by the text x-height line, the top edge of the airspace bounded by a horizontal line at the text ceiling, the left edge of the airspace bounded by a vertical line at the leftmost point of the character, and the right edge of the airspace bounded by a vertical line at the rightmost point of the character. As illustrated in FIG. 2C, the upper airspace of the of the "n" in "Chunky" is highlighted with a grey reference box. The bottom edge of the airspace bounded by the text x-height line of "n", the top edge of the airspace is bounded by a horizonal line at the text ceiling, the left edge of the airspace is bounded by a vertical line at the leftmost point of "n", and the right edge of the airspace bounded by a vertical line at the rightmost point of "n".

Lower airspace 276: A rectangular area for each character, the bottom edge of the airspace bounded by a horizontal line at the text floor, the top edge of the airspace bounded by a horizontal line at the text base line, the left edge of the airspace bounded by a vertical line at the leftmost point of the character, and the right edge of the airspace bounded by a vertical line at the rightmost point of the character. As illustrated in FIG. 2C, the lower airspace of the of the "y" in "Chunky" is highlighted with a grey reference box. The bottom edge of the airspace is bounded by a horizontal line at the text floor, the top edge of the airspace is bounded by the text base line of "n", the left edge of the airspace is bounded by a vertical line at the leftmost point of "n", and the right edge of the airspace bounded by a vertical line at the rightmost point of "n".

Outer airspace 278: The combination of the upper airspace and the lower airspace of each character. As illustrated in FIG. 2C, the outer airspace of the "u" in "Chunky" is highlighted with grey reference boxes.

Character height 280: The distance from the bottommost point of the outer airspace to the topmost point of the outer airspace of a character. As illustrated in FIG. 2C, the character height of the "u" in "Chunky" would be the distance from the bottommost point of the outer airspace to the topmost point of the outer airspace of the "u."

Deemphasis: Any modification to text that makes the deemphasized text less prominent than nearby text. For example, deemphasizing a portion of a character or substring makes the deemphasized portion of the character or substring less prominent than a remainder of the character or substring. Types of deemphasis may include, but are not limited to, scaling down (e.g., reducing a width or height of text), shading (e.g., making text lighter), gradual shading (e.g., making text have a shading gradient), hollowing-out (e.g., removing an inside of a text, leaving only the edges of the text outlined), truncation (e.g, removing character strokes of a text), etc.

Emphasis: Any modification to text that makes the emphasized text more prominent than nearby text. For example, emphasizing a portion of a character or substring makes the emphasized portion of the character or substring stand out compared to the remainder of the character or substring. Types of emphasis may include, but are not limited to, scaling up (e.g., increasing the width or height of text), bolding (e.g., making text darker or thicker), color enhancement (e.g., applying vibrant colors to text), highlighting (e.g., adding a background color or underlining the text), shadowing (e.g., creating a shadow effect to add depth), embossing (e.g., making text appear raised), or applying animations (e.g., making text blink or change dynamically). These techniques draw attention to specific portions of the text, making them visually distinct and prominent.

The "Style" of a character or text includes, but is not limited to, its font, weight, thickness, size, spacing, alignment, color, pattern, highlights, emphasis, emphasized elements, deemphasis, deemphasized elements, and other typographic parameters that dictate the appearance of the character or text.

The "Style" of an object refers to the set of visual attributes and parameters that define its appearance, including, but not limited to, its shape, dimensions, texture, pattern, color, opacity, alignment, rotation, emphasis, deemphasis, highlighted elements, shadows, gradients, borders, fills, and other design elements. Style encompasses all modifications and adjustments that influence the object's aesthetic and functional presentation, whether applied individually or in combination, to create a desired visual effect.

Receiving: Any method for a computing device to obtain data and/or metadata. For example, the computing device can receive character data from a user input (e.g., using a keyboard), from internal memory (e.g., a hard drive), from external memory (e.g., a database), from data generation (e.g., a translation module generates a translation of another text), and so on.

Figure 2D:
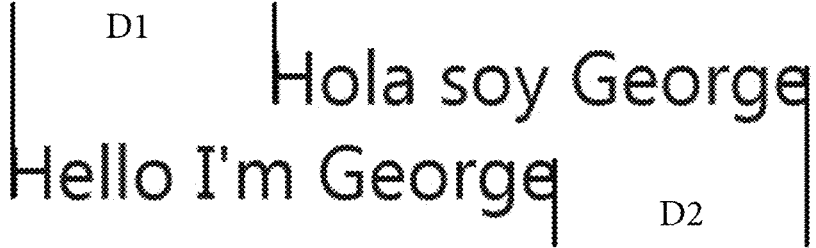
Figure 2E:

Horizontal offset: A second substring is horizontally offset from a first substring if 1) the rightmost point of the second substring is to the right of the rightmost point of the first substring and 2) the leftmost point of the second substring is to the right of the leftmost point of the first substring or 1) the rightmost point of the second substring is to the left of the rightmost point of the first substring and 2) the leftmost point of the second substring is to the left of the leftmost point of the first substring. For example, in FIG. 2D, the second substring "Hola soy George" is horizontally offset to the right of the first substring "Hello I'm George" where the leftmost point of "Hola soy George" is distance D1 to right of the leftmost point of "Hello I'm George" and the rightmost point of "Hola soy George" is distance D2 to the right of the rightmost point of "Hello I'm George. Likewise, in FIG. 2E, the second substring "Hola soy George" is horizontally offset to the left of the first substring "Hello I'm George" where the leftmost point of "Hola soy George" is distance D1 to left of the leftmost point of "Hello I'm George" and the rightmost point of "Hola soy George" is distance D2 to the left of the rightmost point of "Hello I'm George.

A second substring is also horizontally offset from a first substring if, when the reading direction of the first substring is left to right, the 1) the leftmost point of the second substring is to the right of the leftmost point of the first substring and 2) the majority of the width of the second substring is in between the center point of the first substring and the rightmost point of the first substring.

A second substring is also horizontally offset from a first substring if, when the reading direction of the first substring is right to left, the 1) the rightmost point of the second substring is to the left of the rightmost point of the first substring and 2) the majority of the width of the second substring is in between the center point of the first substring and the leftmost point of the first substring.

A second substring is also horizontally offset from a first substring if, when the reading direction of the first substring is left to right, the 1) the leftmost point of the second substring is to the right of the leftmost point of the first substring and 2) at least two thirds of the width of the second substring is in between the center point of the first substring and the rightmost point of the first substring.

A second substring is also horizontally offset from a first substring if, when the reading direction of the first substring is right to left, the 1) the rightmost point of the second substring is to the left of the rightmost point of the first substring and 2) at least two thirds of the width of the second substring is in between the center point of the first substring and the leftmost point of the first substring.

It shall be noted that, unless specified otherwise, the following exemplary methods can be applied to characters and texts of any typeface, font, and size. For example, the methods can be applied to characters displayed in 12-point Times New Roman typeface as well as to characters displayed in 10-point Calibri typeface. These examples, as well as all other illustrated and described typefaces, font sizes, and fonts, are not inclusive and shall not be interpreted in any way to limit the scope of the present invention.

Figure 3:
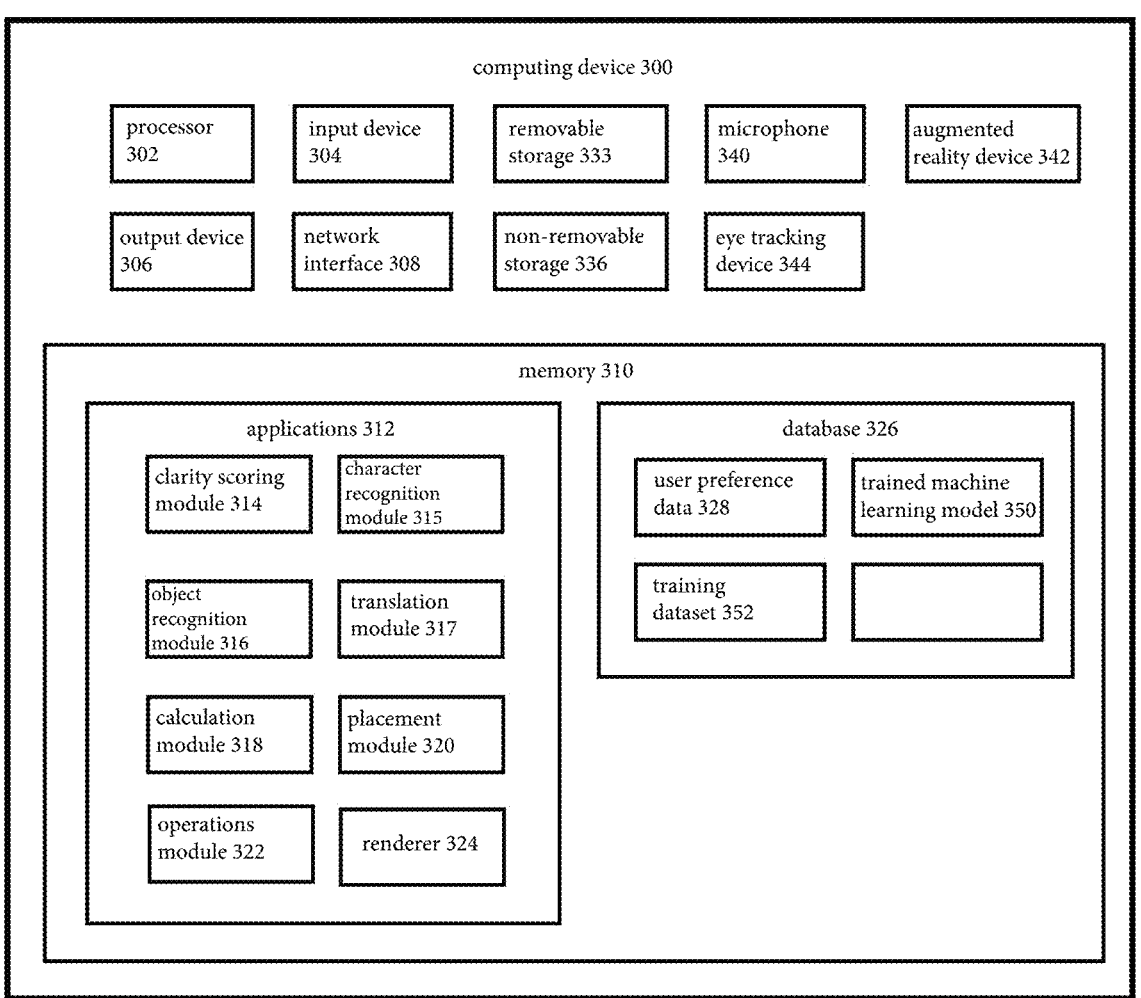
FIG. 3 shows a block diagram illustrating example physical components (e.g., hardware) of a computing device with which aspects of the disclosure may be practiced.

Reference is now made to FIG. 3, which shows a block diagram illustrating example physical components of a computing device 300 with which aspects of the disclosure may be practiced. The computing device may be referred to as the system.

In a preferred embodiment, the computing device 300 includes at least one processor 302, an input device 304 such as a keyboard, mouse, and or touchscreen, and an output device 306 such as a printer or an electronic display in any of the various forms associated with computing devices. The computing device may also include a network interface 308 for network enablement. It should be appreciated that processing may be implemented either locally or remotely via various forms of wireless or wired networking technologies or a combination of both.

In some embodiments, the computing device 300 includes a microphone 340 electrically connected to the processor 302, either directly or through a network interface 308. The microphone 340 could be one of the input devices 304. Microphone 340 could be used to listen for spoken words and to provide an input of spoken words to the computing device 300.

The computing device 300 could also include an augmented reality device 342 electrically connected, either directly or through the network interface 308, to provide a view of a user's surroundings along with translated words of what is spoken. The augmented reality device 342 could be an output device 306.

An eye-tracking device 344 could also be electrically connected to the computer device 300, either directly or through a network interface 308. The eye tracking device 344 could be a small video camera that looks into a user's retina to see the image on the back of the eye, thus detecting what the eye is looking at. In other embodiments, the eye tracker 344 captures the position or location of the user's eyes on one small video camera and the place the eye is looking on a second video camera. The first video camera and the second video camera work together so that the second video camera captures what the eye is gazing upon. Both eye tracing 344 embodiments provide the computing device 300 with a video stream of what the eye is looking at.

The eye tracking device 344 could be used in conjunction with the 324 to determine when the user has finished reading a page of text so that the renderer can display the next page of text/translation or scroll the next line of the text/translation.

In another embodiment, the eye tracking device 344 could be used to provide feedback to a language teacher on how fast a student is reading in the foreign language or to provide feedback to the teach on whether the student is looking at the foreign language or the translation. The feedback could also notify the teacher of areas where the student is having difficulty. The eye tracking device 344 could compile statistics on where the student's eyes are as the student reads a passage, and the statistics could be sent to the teacher. These statistics could include eye position, eye movements, and eye movement patterns. The statistics could be provided to a teacher and/or the student.

The memory 310 may include various types of short and long-term memory as is known in the art. Memory 310 may be loaded with various applications 312 including a clary scoring module 314 for calculating a clarity score for text and/or objects on an electronic display, a character recognition module 315 for identifying text in an image, an object recognition module 316 for identifying objects in an image, a translation module 317 for translating various foreign languages into either English or other chosen languages, a calculation module 318 for defining airspaces of text and/or objects as will be further discussed, a placement module 320 for placing text and/or objects as will be further discussed, an operations module 322 for performing various adaptations to the text and/or objects as will be further discussed, and a renderer 324 for rendering the text and/or objects for display as will be further discussed. Accordingly, memory 310 includes all necessary modules per each embodiment.

The clarity scoring module 314 calculates clarity scores of texts and/or objects displayed on an electronic display. The clarity score of a text represents how readable and/or identifiable the text is. For example, a standalone text would receive a higher clarity score than the same text partially overlapped by another text. Likewise, the clarity score of an object represents how identifiable the object is. For example, cat in an image would receive a higher clarity score than the same cat partially overlapped by text.

To calculate the clarity score of a text, the clarity scoring module 314 can use OCR software with confidence scoring, text readability analysis tools, computer vision software with text analysis tools, combined OCR and contrast analysis tools, machine learning models for clarity predictions, or any combination thereof. These tools can use measurable metrics such as recognition accuracy (how well the OCR identifies the text), contrast ratio (the difference in brightness between text and its background or overlapping text), occlusion percentage (the proportion of the text string covered by overlapping elements), and/or pixel sharpness (the clarity of the text pixels, considering blur or distortion) to calculate the clarity score.

OCR software identifies and extracts text from images and assigns confidence scores to the recognition of each character or word in the text. The clarity score can be inferred from the OCR confidence level. The higher the OCR confidence score, the more identifiable the text is in the image. OCR software includes, but is not limited to, Tesseract OCR, ABBYY FineReader, Google Vision API, and Microsoft Azure Computer Vision.

Text readability analysis tools analyze and score text readability by assessing visual features such as contrast, overlap, and spacing. A clarity score can be assigned based on standards like WCAG (Web Content Accessibility Guidelines). Text readability analysis tools include, but are not limited to, WCAG compliance tools (e.g., Stark, aXe), Adobe XD plugins, or custom algorithms.

Computer vision software with text analysis tools analyze the image for the relative visibility of the text when partially obscured. Segmentation algorithms can be used to isolate the text from the image. Visual features such as overlapping regions, obstruction size, and pixel clarity are measured. A clarity score of the text string is calculated based on the degree of overlap or obstruction. Computer vision software with text analysis tools include, but are not limited to, OpenCV, TensorFlow, PyTorch, and Google Vision API.

Combined OCR and contrast analysis tools perform a contrast and spatial analysis of the text. OCR can be used to extract the text and check recognition accuracy. The color and brightness contrast between the text and other elements, as well as the spatial overlap between the text and other elements can be calculated. These metrics are combined into an overall clarity score.

Machine learning models 350 predict clarity scores by learning from labeled datasets of clear and obscured text images. The model is trained on a dataset of images with corresponding clarity labels or scores. These labels might represent how clearly text is visible or how easily it can be read by humans or recognized by OCR systems. Training involves exposing the model to thousands of examples of clear text, partially obscured text, and unreadable text (training datasets 352), allowing it to learn features such as: text obstruction (e.g., overlapping elements), font size and Style, background contrast and texture, image noise or blurriness, spatial layout and alignment of overlapping text. For example, an image labeled with a high clarity score might show clear, unobstructed text with high contrast, while an image with a low score might have text obscured by overlapping elements or a noisy background.

During training, the model identifies features that strongly correlate with text clarity. For instance: Spatial features-identifying areas where the text overlaps another element and determining the extent of obstruction; Contrast analysis-measuring the difference in luminance between the text and the background to assess readability; Structural integrity-recognizing how well-defined the text characters are, particularly in the presence of blur, distortion, or noise. These extracted features are processed through layers of the neural network to predict a clarity score, often represented as a normalized value between 0 and 1 or on a defined scale (e.g., 1 to 10).

Once the model is trained, it is evaluated using a test dataset that includes images the model has not seen before. The performance is measured using metrics like accuracy, precision, recall, and F1-score, depending on whether clarity prediction is treated as a classification problem (e.g., clear vs. unclear) or regression problem (e.g., predicting a numeric clarity score). Fine-tuning may involve adjusting hyperparameters, adding additional training data, or incorporating domain-specific preprocessing techniques, such as enhancing contrast or filtering out irrelevant parts of the image.

Machine learning models for clarity prediction are especially useful in scenarios where traditional methods like OCR or contrast ratio analysis fall short. For example, when the text is obscured by other elements, such as watermarks, captions, or decorative overlay, when evaluating text clarity in blurry, pixelated, or low-resolution images, or when tailoring the model to specific requirements, such as predicting clarity scores for accessibility compliance or brand-specific design standards.

After training, the ML model can be integrated into the clarity scoring module 314 for real-time clarity assessment. For instance, the clarity scoring module 314 could use the model to calculate a predicted clarity score.

Using pre-trained models like ResNet or EfficientNet, fine-tuned for clarity prediction, can reduce training time and improve accuracy. Adding attention layers to focus the model on text areas of the image rather than irrelevant background features. Combining image data with metadata, such as font type, text size, and position, to provide a more comprehensive clarity prediction. Examples of machine learning models include, but are not limited to, custom models built with PyTorch, TensorFlow, or Keras.

To calculate the clarity score of an object, the clarity scoring module 314 can use object detection and recognition software, semantic segmentation tools, feature extraction and comparison tools, saliency detection tools, image quality assessment tools, machine learning models for clarity predictions, or any combination thereof. These tools can use measurable metrics such as recognition accuracy (the effectiveness of object detection or recognition algorithms in identifying the object in the image), occlusion percentage (the proportion of the object that is obscured or covered by other elements in the image), contrast ratio (the difference in brightness or color between the object and its background), edge sharpness (the sharpness and clarity of the object's edges), pixel clarity/noise ratio (the quality of the pixels within the object-identifying issues like noise, compression artifacts, or low resolution), spatial frequency (the amount of detail present in the object based on variations in pixel intensity), color distinction (the distinctiveness of the object's color in contrast to its background or overlapping elements), and saliency detection (how prominently the object stands out in the image, based on factors like contrast, brightness, and edge sharpness).

Object detection and recognition software detects and classifies objects in an image and measures the accuracy or confidence of detection. A computer vision library that can identify features and regions in an image using algorithms like Haar cascades or DNN modules. A clarity score can be calculated based on the accuracy or confidence of detection. Object detection and recognition software include, but is not limited to, TensorFlow and PyTorch (Deep learning frameworks with pre-trained models for object detection), YOLO (You Only Look Once), SSD (Single Shot Detector), or Faster R-CNN.

Semantic segmentation tools analyze how much of the objects area overlaps with the other elements on the electronic display and how this affects pixel classification accuracy. A clarity score can be calculated based on the percentage of the object's area that can be successfully segmented and classified. Semantic segmentation tools include, but are not limited to, Detectron2, DeepLab, or SegNet. Image quality assessment tools such as BRISQUE or NIQE (Naturalness Image Quality Evaluator) can also be used to calculate a clarity score based on similar metrics.

Feature extraction and comparison tools analyze the number of features successfully detected in the object. An increase or decrease in detectable features gives a quantitative measure of how the clarity score changes. Feature extraction and comparison tools, but are not limited to, algorithms like SIFT (Scale-Invariant Feature Transform) or SURF (Speeded-Up Robust Features).

Saliency detection tools generate saliency maps for both images to determine how prominent the object is compared to other elements on the electronic display. A clarity score can be calculated based on the prominence. Saliency detection tools include, but are not limited to, DeepGaze and UNISAL. Saliency modules can also be used to measure which areas of the image draw attention.

Machine learning models predict clarity scores by learning from labelled datasets of clear and obscured object images. The training process introduces the model to a variety of scenarios, such as fully visible objects, partially obscured objects, and heavily distorted images. The features learned during training often include: Object occlusion-identifying the extent to which an object is obscured; Background interference-detecting complex patterns or distracting elements that may reduce object clarity; Resolution and sharpness-recognizing objects in images with varying degrees of pixelation or blur; Contrast and lighting-understanding how brightness and contrast between the object and its surroundings impact clarity. For example, an image labeled with a high clarity score might depict a fully visible object without any interference, while a low-score image could show the same object partially overlapped by other elements; Edge detection-measuring the sharpness and integrity of object boundaries, which can degrade with occlusion or blurring; Texture and pattern recognition-identifying unique visual characteristics of the object that distinguish it from the background; Spatial relationship-understanding how the object's position and orientation in the image affect visibility. These features are processed through layers of the neural network to generate clarity scores, typically represented on a continuous scale (e.g., 0 to 1) or categorized into qualitative levels (e.g., "clear," "partially clear," "unclear").

After training, the model is validated using a test dataset of unseen images to measure its performance. Metrics such as mean squared error (for regression tasks) or accuracy and F1-score (for classification tasks) are used to evaluate the model's reliability. Fine-tuning involves adjusting hyperparameters, augmenting the training data with additional scenarios, or applying preprocessing techniques such as contrast enhancement or noise reduction to improve model accuracy.

ML models for object clarity prediction are particularly effective in scenarios where traditional methods, like basic edge detection or segmentation algorithms, are insufficient: evaluating clarity when objects are partially covered by overlays or other elements in the image, scoring objects in noisy, blurred, or pixelated images, determining clarity in images taken under varying lighting or motion conditions, such as security footage or sports photography.

Pre-trained models like YOLO or Faster R-CNN can be utilized and fine-tuned for clarity prediction can save time and improve performance. Integrating attention layers enables the model to focus on the object of interest, ignoring irrelevant parts of the image. Image data can be combined with additional contextual information, such as object metadata or positional attributes, to enhance clarity prediction accuracy.

The translation module 317 could be a series of instructions for the at least one processor 302, stored in the memory 310, and organized as an application or a subroutine. The translation module 317 translates the clauses, as stored in the table, from one human language into another. For instance, the translation of the clause could be from English to Hebrew, or back. In some embodiments, the clause clusters from the source string are run through a look-up table that returns the destination string in the second language. In some embodiments, the clause clusters are processed through a rules engine to return the translated clause. Other embodiments use neural networks or other machine learning techniques to convert the clauses into the second language. The translated clauses may be stored in a translation table. The translation module may also create a translated string.

The calculation module 318 could be a series of instructions for the at least one processor 302, stored in the memory 310, and organized as an application or a subroutine. The calculation module 318 defines airspaces of texts and/or objects using image processing software and machine learning models. Such image processing software includes, but is not limited to, YOLO (real-time object detection algorithm that can identify objects and draw bounding boxes in a single pass through the image), Faster R-CNN (A deep learning-based framework that detects objects by proposing regions of interest and refining their boundaries), Single Shot MultiBox Detector (Detects objects and their bounding boxes using a single forward pass of a convolutional neural network), OpenCV (An open-source computer vision library that includes functions for image processing and drawing bounding boxes, though typically combined with machine learning models for detection), and MATLAB Image Processing Toolbox (tools for detecting and marking objects or text regions with bounding boxes, suitable for academic and research purposes).

The placement module 320 could be a series of instructions for the at least one processor 302, stored in the memory 310, and organized as an application or a subroutine. The placement module 320 places text and/or objects.

The operations module 322 could be a series of instructions for the at least one processor 302, stored in the memory 310, and organized as an application or a subroutine. The operations module 322 may perform various adaptations to texts and/or objects. Adaptations can include, but are not limited to, moving a text or object and/or a portion of a text or object, scaling up a text or object and/or a portion of a text or object, scaling down a text or object and/or a portion of a text or object, emphasizing a text or object and/or a portion of a text or object, deemphasizing a text or object and/or a portion of a text or object, changing a Style of a text or object and/or a portion of a text or object, tilting a text or object and/or a portion of a text or object, or otherwise changing an appearance of a text or object and/or a portion of a text or object.

The operations module 322 can incorporate existing text editing tools to perform the adaptations. These tools can include, but are not limited to: Graphic Design Software (Adobe Photoshop, Adobe Illustrator, CorelDRAW, Affinity Designer, Canva); Desktop Publishing Software (Adobe InDesign, QuarkXPress, Microsoft Publisher); Presentation Software (Examples: Microsoft PowerPoint, Google Slides, Keynote); Specialized Text Animation Software (Adobe After Effects, Blender (for 3D text), Synfig Studio); Word Processing Software (Microsoft Word, Google Docs, Libre-Office); Web-Based Tools and Code (Figma, Canva, HTML/CSS editors); and Font Creation and Customization Tools (FontForge, Glyphs, RoboFont).

The renderer 324 could be a series of instructions for the at least one processor 302, stored in the memory 310, and organized as an application or a subroutine. The renderer 324 renders texts and/or objects for display.

In some embodiments, the clarity scoring module 314, character recognition module 315, object recognition module 316, translation module 317, calculation module 318, placement module 320, operations module 322, and/or the renderer 324 could be located on another computing device and the parameters for the modules could be sent over a network.

Memory 310 may further include a database 326 loaded with user preference data 334.

The term computer readable media as used herein may include computer storage media. Computer storage media may include volatile and nonvolatile, removable and non-removable media implemented in any method or technology for storage of information, such as computer readable instructions, data structures, or program modules. The memory 310, the removable storage device 333 and the non-removable storage device 336 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 300. Any such computer storage media may be part of the computing device 300. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The computing device 300 is operative to employ various font technologies like variable fonts, raster, vector, TrueType, and Microsoft OpenType and the database 326 also includes associated font-resource files.

FIG. 4 is a flowchart showing steps of an exemplary method 400 of displaying a text string and associated content. At step 402, the contents of an electronic display, or a portion thereof, are scanned and converted into a digital image. Alternatively, a saved digital image (e.g., a PNG, JPEG, or PDF) is provided by the user.

At step 404, the character recognition module 315, working in conjunction with the calculation module 318, identifies text strings within the digital image and defines an airspace for each identified text string.

At step 406, the object recognition module 316, working in conjunction with the calculation module 318, identifies objects within the digital image and defines an airspace for each identified object.

At step 408, an identified text string is selected for clarity improvement. Preferably, the selected text string overlaps an airspace of its associated content, where the associated content is another identified text string or an identified object. Alternatively, the selected text string overlaps the body of its associated content, where the associated content is another identified text string or an identified object.

At step 410, the clarity scoring module 314 calculates a clarity score for the selected text string, a clarity score for the associated content, and a combined clarity score. In a preferred embodiment, the clarity scoring module 314 uses OCR software with confidence scoring, text readability analysis tools, computer vision software with text analysis tools, combined OCR and contrast analysis tools, machine learning models for clarity predictions, or any combination thereof to calculate the clarity score for the selected text string. If the associated content is another text string, the clarity scoring module 314 uses OCR software with confidence scoring, text readability analysis tools, computer vision software with text analysis tools, combined OCR and contrast analysis tools, machine learning models for clarity predictions, or any combination thereof to calculate the clarity score for the associated content. If the associated content is an object, the clarity scoring module 314 can use object detection and recognition software, semantic segmentation tools, feature extraction and comparison tools, saliency detection tools, image quality assessment tools, machine learning models, or any combination thereof to calculate the clarity score of the associated content.

In a preferred embodiment, the combined clarity score is equal to the clarity score of the text string plus the clarity score of the associated content. For example, using the following formula:

$$combined\_clarity\_score =$$
$$text\_string\_clarity\_score + associated\_content\_clarity\_score$$

Alternatively, the clarity score values of the text string and the clarity score of the associated content are weighted according to variables x and y. For example, using the following formula:

$$\text{combined\_clarity\_score} =$$
$$x * \text{text\_string\_clarity\_score} + y * \text{associated\_content\_clarity\_score}$$

The use of variable weighting schemes for determining the combined clarity score offers flexibility and customization in prioritizing the clarity scores of different components. Specifically, it allows for dynamic emphasis allocation. By introducing variables x and y, the formula allows for dynamic adjustment of the relative importance of the clarity score of the text string and the clarity score of the associated content. This enables fine-tuning based on specific use cases, such as emphasizing one component over the other to align with user preferences or application needs.

Different applications may require varying levels of focus on the text string or associated content. For instance, if the primary objective is to enhance text readability, x can be assigned a higher value. Conversely, if the clarity of the associated content is deemed more critical, y can be weighted more heavily. Variable weighting schemes provide a more accurate representation of the overall clarity by accommodating diverse factors, such as content complexity, audience preferences, or contextual relevance.

In a preferred embodiment, x is greater than y, placing emphasis on the clarity of the text string. Alternatively, x is equal to y or approximately equal to y, ensuring that both the text string and the associated content contribute proportionally to the combined clarity score. This prevents any single component from disproportionately influencing the overall clarity assessment. Yet alternatively, x is less than y, placing emphasis on the clarity of the associated content. Yet alternatively, y is equal to zero, placing emphasis only on the clarity of the text string. Yet alternatively, x is equal to zero, placing emphasis only on the clarity of the associated content.

In another embodiment, the combined clarity score is equal to clarity score of the text string times the clarity score of the associated content. For example, using the following formulas:

$$\text{combined\_clarity\_score} =$$
$$\text{text\_string\_clarity\_score} * \text{associated\_content\_clarity\_score}$$

$$\text{combined\_clarity\_score} =$$
$$x * \text{text\_string\_clarity\_score} * y * \text{associated\_content\_clarity\_score}$$

In another embodiment, the combined clarity score is equal to a weighted average of the clarity score of the text string times the clarity score of the associated content. For example, using the following formula:

$$\text{combined\_clarity\_score} =$$
$$(x * \text{text\_string\_clarity\_score} + y * \text{associated\_content\_clarity\_score}) /$$
$$(x + y)$$

In another embodiment, the combined clarity score is equal to a geometric mean of the clarity score of the text string times the clarity score of the associated content. For example, using the following formula:

$$\text{combined\_clarity\_score} =$$
$$\mathit{sqrt}(\text{text\_string\_clarity\_score} * \text{associated\_content\_clarity\_score})$$

$$\text{combined\_clarity\_score} =$$
$$(\text{text\_string\_clarity\_score}^{\wedge}x * \text{associated\_content\_clarity\_score}^{\wedge}y)^{\wedge}$$
$$(1/(x + y))$$

In another embodiment, the combined clarity score is equal to a harmonic mean of the clarity score of the text string times the clarity score of the associated content. For example, using the following formulas:

$$\text{combined\_clarity\_score} =$$
$$(2 * \text{text\_string\_clarity\_score} * \text{associated\_content\_clarity\_score}) /$$
$$(\text{text\_string\_clarity\_score} + \text{associated\_content\_clarity\_score})$$

$$\text{combined\_clarity\_score} =$$
$$(2 * x * \text{text\_string\_clarity\_score} * y * \text{associated\_content\_clarity\_score}) /$$
$$(x * \text{text\_string\_clarity\_score} + y * \text{associated\_content\_clarity\_score})$$

In another embodiment, the combined clarity score is equal to a logarithmic combination of the clarity score of the text string times the clarity score of the associated content. For example, using the following formulas:

$$\text{combined\_clarity\_score} =$$
$$\log(x * \text{text\_string\_clarity\_score} + y * \text{associated\_content\_clarity\_score})$$

$$\text{combined\_clarity\_score} = x * \log(\text{text\_string\_clarity\_score}) +$$
$$y * \log(\text{associated\_content\_clarity\_score})$$

In another embodiment, the combined clarity score is equal to an exponential scaling of the clarity score of the text string plus the clarity score of the associated content. For example, using the following formulas:

$$\text{combined\_clarity\_score} =$$
$$\exp(x * \text{text\_string\_clarity\_score} + y * \text{associated\_content\_clarity\_score})$$

$$\text{combined\_clarity\_score} = x * \exp(\text{text\_string\_clarity\_score}) +$$
$$y * \exp(\text{associated\_content\_clarity\_score})$$

In another embodiment, the combined clarity score is equal to max/min function of the clarity score of the text string and the clarity score of the associated content. For example, using the following formulas:

Max Version:

$$\text{combined\_clarity\_score} =$$
$$\max(x * \text{text\_string\_clarity\_score}, y * \text{associated\_content\_clarity\_score})$$

Min Version:

$$combined\_clarity\_score =$$

$$\min(x * text\_string\_clarity\_score, \, y * associated\_content\_clarity\_score)$$

In another embodiment, the combined clarity score is equal to an absolute difference of the clarity score of the text string and the clarity score of the associated content. For example, using the following formulas:

Difference:

$$combined\_clarity\_score =$$

$$(x * text\_string\_clarity\_score - y * associated\_content\_clarity\_score)$$

Absolute Difference:

$$combined\_clarity\_score =$$

$$|x * text\_string\_clarity\_score - y * associated\_content\_clarity\_score|$$

In another embodiment, the combined clarity score is equal to a ratio of the clarity score of the text string and the clarity score of the associated content. For example, using the following formula:

$$combined\_clarity\_score =$$

$$(x * text\_string\_clarity\_score) / (y * associated\_content\_clarity\_score)$$

Alternative Step 410:

At step 410, the clarity scoring module 314 calculates a clarity score for the selected text string. In a preferred embodiment, the clarity scoring module 314 uses OCR software with confidence scoring, text readability analysis tools, computer vision software with text analysis tools, combined OCR and contrast analysis tools, machine learning models for clarity predictions, or any combination thereof to calculate the clarity score for the selected text string.

At step 412, the digital image is recreated in a virtual environment.

At step 414, an adaptation is applied to the selected text string within the virtual environment.

At step 416, the clarity scoring module 314 calculates a clarity score for the selected text string having the adaptation, a clarity score for the associated content, and a combined clarity score.

At step 418, the renderer 324 renders the selected text string and its associated content for display on the electronic display. If the adaptation to the selected text string results in a higher combined clarity score (e.g., for the selected text string and its associated content, the combined clarity score is higher in the recreated digital image than in the original digital image received in step 402), the selected text string is rendered having the adaptation. If the adaptation to the selected text string does not result in a higher combined clarity score, no further action is taken.

At step 420, the text string having the adaptation and its associated content are displayed on the electronic display.

Alternative Steps 414-420:

At step 414, a plurality of adaptations are applied to the selected text string within the virtual environment. Each adaptation is unique (e.g., a first adaptation is moving the selected text string 2 mm to the left, a second adaptation is moving the selected text string 1 mm to the left, a third adaptation is moving the selected text string 1 mm to the right, and a fourth adaptation is moving the selected text string 2 mm to the right).

At step 416, for each of the adaptations, the clarity scoring module 314 calculates a clarity score for the selected text string having the adaptation, a clarity score for the associated content, and a combined clarity score. The adaptation resulting in the highest combined clarity score is saved as the optimal adaptation.

At step 418, the renderer 324 renders the selected text string and its associated content for display on the electronic display. If the optimal adaptation to the selected text string results in a higher combined clarity score (e.g., for the selected text string and its associated content, the combined clarity score is higher in the recreated digital image than in the original digital image received in step 402), the selected text string is rendered having the adaptation. If the optimal adaptation to the selected text string does not result in a higher combined clarity score, no further action is taken.

At step 420, the text string having the optimal adaptation and its associated content are displayed on the electronic display.

Alternative Steps 414-420:

At step 414, an adaptation is applied to the selected text string within the virtual environment.

At step 416, the clarity scoring module 314 calculates a clarity score for the selected text string having the adaptation.

At step 418, the renderer 324 renders the selected text string and its associated content for display on the electronic display. If the adaptation to the selected text string results in a higher clarity score (e.g., for the selected text string, the clarity score is higher in the recreated digital image than in the original digital image received in step 402), the selected text string is rendered having the adaptation. If the adaptation to the selected text string does not result in a higher clarity score, no further action is taken.

At step 420, the text string having the adaptation and its associated content are displayed on the electronic display.

Alternative Steps 414-420:

At step 414, a plurality of adaptations are applied to the selected text string within the virtual environment. Each adaptation is unique (e.g., a first adaptation is moving the selected text string 2 mm to the left, a second adaptation is moving the selected text string 1 mm to the left, a third adaptation is moving the selected text string 1 mm to the right, and a fourth adaptation is moving the selected text string 2 mm to the right).

At step 416, for each of the adaptations, the clarity scoring module 314 calculates a clarity score for the selected text string having the adaptation. The adaptation resulting in the highest clarity score is saved as the optimal adaptation.

At step 418, the renderer 324 renders the selected text string and its associated content for display on the electronic display. If the optimal adaptation to the selected text string results in a higher combined clarity score (e.g., for the selected text string and its associated content, the clarity score is higher in the recreated digital image than in the original digital image received in step 402), the selected text string is rendered having the adaptation. If the optimal adaptation to the selected text string does not result in a higher clarity score, no further action is taken.

At step 420, the text string having the optimal adaptation and its associated content are displayed on the electronic display.

Alternative Steps 414-420:

At step 414, an adaptation is applied to the associated content within the virtual environment.

At step 416, the clarity scoring module 314 calculates a clarity score for the selected text string, a clarity score for the associated content, and a combined clarity score.

At step 418, the renderer 324 renders the selected text string and its associated content for display on the electronic display. If the adaptation to the associated content results in a higher combined clarity score (e.g., for the selected text string, the combined clarity score is higher in the recreated digital image than in the original digital image received in step 402), the associated content is rendered having the adaptation. If the adaptation to the associated content does not result in a higher combined clarity score, no further action is taken.

At step 420, the text string and its associated content having the adaptation are displayed on the electronic display.

Alternative Steps 414-420:

At step 414, a plurality of adaptations are applied to the associated content within the virtual environment. Each adaptation is unique (e.g., a first adaptation is moving the associated content 2 mm to the left, a second adaptation is moving the associated content 1 mm to the left, a third adaptation is moving the associated content 1 mm to the right, and a fourth adaptation is moving the associated content 2 mm to the right).

At step 416, for each of the adaptations, the clarity scoring module 314 calculates a clarity score for the selected text string, a clarity score for the associated content, and a combined clarity score. The adaptation resulting in the highest combined clarity score is saved as the optimal adaptation.

At step 418, the renderer 324 renders the selected text string and its associated content for display on the electronic display. If the optimal adaptation to the associated content results in a higher combined clarity score (e.g., for the selected text string and its associated content, the combined clarity score is higher in the recreated digital image than in the original digital image received in step 402), the associated content is rendered having the adaptation. If the optimal adaptation to the associated content does not result in a higher combined clarity score, no further action is taken.

At step 420, the text string and its associated content having the optimal adaptation are displayed on the electronic display.

Alternative Steps 414-420:

At step 414, an adaptation is applied to the associated content within the virtual environment.

At step 416, the clarity scoring module 314 calculates a clarity score for the selected text string.

At step 418, the renderer 324 renders the selected text string and its associated content for display on the electronic display. If the adaptation to the associated content results in a higher clarity score (e.g., for the selected text string, the clarity score is higher in the recreated digital image than in the original digital image received in step 402), the associated content is rendered having the adaptation. If the adaptation to the associated content does not result in a higher clarity score, no further action is taken.

At step 420, the text string and its associated content having the adaptation are displayed on the electronic display.

Alternative Steps 414-420:

At step 414, a plurality of adaptations are applied to the associated content within the virtual environment. Each adaptation is unique (e.g., a first adaptation is moving the associated content 2 mm to the left, a second adaptation is moving the associated content 1 mm to the left, a third adaptation is moving the associated content 1 mm to the right, and a fourth adaptation is moving the associated content 2 mm to the right).

At step 416, for each of the adaptations, the clarity scoring module 314 calculates a clarity score for the selected text string. The adaptation resulting in the highest clarity score is saved as the optimal adaptation.

At step 418, the renderer 324 renders the selected text string and its associated content for display on the electronic display. If the optimal adaptation to the associated content results in a higher clarity score (e.g., for the selected text string and its associated content, the clarity score is higher in the recreated digital image than in the original digital image received in step 402), the associated content is rendered having the adaptation. If the optimal adaptation to the associated content does not result in a higher clarity score, no further action is taken.

At step 420, the text string and its associated content having the optimal adaptation are displayed on the electronic display.

Alternative Steps 414-420:

At step 414, a first adaptation is applied to the selected text string and a second adaptation is applied to its associated content within the virtual environment.

At step 416, the clarity scoring module 314 calculates a clarity score for the selected text string having the adaptation, a clarity score for the associated content having the adaptation, and a combined clarity score.

At step 418, the renderer 324 renders the selected text string and its associated content for display on the electronic display. If the first adaptation to the selected text string and the second adaptation to its associated content result in a higher combined clarity score (e.g., for the selected text string and its associated content, the combined clarity score is higher in the recreated digital image than in the original digital image received in step 402), the selected text string is rendered having the first adaptation and its associated content is rendered having the second adaptation. If the first adaptation to the selected text string and the second adaptation to its associated content do not result in a higher combined clarity score, no further action is taken.

At step 420, the text string having the first adaptation and its associated content having the second adaptation are displayed on the electronic display.

Alternative Steps 414-420:

At step 414, a plurality of first adaptations are applied to the selected text string and a plurality of second adaptations are applied to its associated content within the virtual environment. Each adaptation is unique (e.g., a first first adaptation is moving the selected text string 2 mm to the left, a second first adaptation is moving the selected text string 1 mm to the left, a third first adaptation is moving the selected text string 1 mm to the right, and a fourth first adaptation is moving the selected text string 2 mm to the right; a first second adaptation is moving the associated content 2 mm to the left, a second second adaptation is moving the associated content 1 mm to the left, a third second adaptation is moving the associated content 1 mm to the right, and a fourth second adaptation is moving the associated content 2 mm to the right).

At step 416, for each of the adaptations, the clarity scoring module 314 calculates a clarity score for the selected text string having the adaptation, a clarity score for the associated content having the adaptation, and a combined clarity score. The first and second adaptations resulting in the highest combined clarity score are saved as the optimal first and second adaptations.

At step 418, the renderer 324 renders the selected text string and its associated content for display on the electronic display. If the optimal first adaptations to the selected text string and the optimal second adaptation to its associated content result in a higher combined clarity score (e.g., for the selected text string and its associated content, the combined clarity score is higher in the recreated digital image than in the original digital image received in step 402), the selected text string is rendered having the optimal first adaptation and its associated content is rendered having the optimal second adaptation. If the optimal first adaptation to the selected text string and the optimal second adaptation to its associated content does not result in a higher combined clarity score, no further action is taken.

At step 420, the text string having the optimal first adaptation and its associated content having the optimal second adaptation are displayed on the electronic display. Alternative Steps 414-420:

At step 414, a first adaptation is applied to the selected text string and a second adaptation is applied to its associated content within the virtual environment.

At step 416, the clarity scoring module 314 calculates a clarity score for the selected text string having the adaptation.

At step 418, the renderer 324 renders the selected text string and its associated content for display on the electronic display. If the first adaptation to the selected text string and the second adaptation to its associated content result in a higher clarity score (e.g., for the selected text string and its associated content, the clarity score is higher in the recreated digital image than in the original digital image received in step 402), the selected text string is rendered having the first adaptation and its associated content is rendered having the second adaptation. If the first adaptation to the selected text string and the second adaptation to its associated content do not result in a higher clarity score, no further action is taken.

At step 420, the text string having the first adaptation and its associated content having the second adaptation are displayed on the electronic display. Alternative Steps 414-420:

At step 414, a plurality of first adaptations are applied to the selected text string and a plurality of second adaptations are applied to its associated content within the virtual environment. Each adaptation is unique (e.g., a first first adaptation is moving the selected text string 2 mm to the left, a second first adaptation is moving the selected text string 1 mm to the left, a third first adaptation is moving the selected text string 1 mm to the right, and a fourth first adaptation is moving the selected text string 2 mm to the right; a first second adaptation is moving the associated content 2 mm to the left, a second second adaptation is moving the associated content 1 mm to the left, a third second adaptation is moving the associated content 1 mm to the right, and a fourth second adaptation is moving the associated content 2 mm to the right).

At step 416, for each of the adaptations, the clarity scoring module 314 calculates a clarity score for the selected text string having the adaptation. The first and second adaptations resulting in the highest clarity score are saved as the optimal first and second adaptations.

At step 418, the renderer 324 renders the selected text string and its associated content for display on the electronic display. If the optimal first adaptations to the selected text string and the optimal second adaptation to its associated content result in a higher clarity score (e.g., for the selected text string and its associated content, the clarity score is higher in the recreated digital image than in the original digital image received in step 402), the selected text string is rendered having the optimal first adaptation and its associated content is rendered having the optimal second adaptation. If the optimal first adaptation to the selected text string and the optimal second adaptation to its associated content does not result in a higher clarity score, no further action is taken.

At step 420, the text string having the optimal first adaptation and its associated content having the optimal second adaptation are displayed on the electronic display.

Figures 5A, 5B:
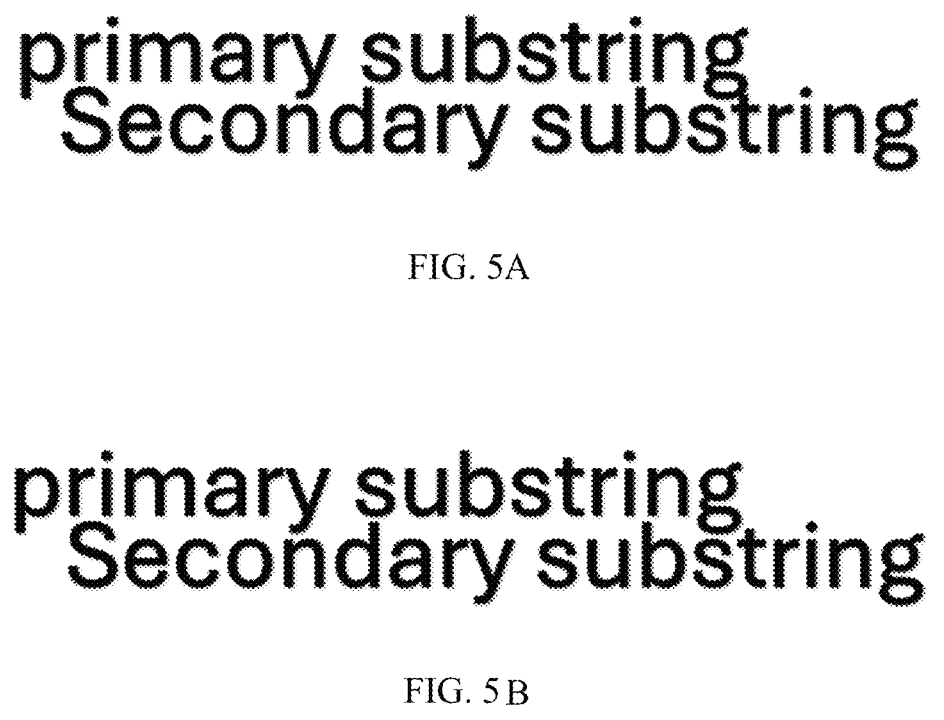

According to an embodiment, the adaptation is a change in the x-position of the selected text string or a portion thereof. For example, as shown in FIG. 5A to FIG. 5B, the adaptation is moving the text string 1 mm to the left. Alternatively, the adaptation is a change in the y-position of the selected text or a portion thereof. Yet alternatively, the adaptation is a change in the x-y-position of the selected text or a portion thereof. It should be appreciated that such an adaptation can also be applied to an object or a portion thereof.

Figures 5C, 5D:
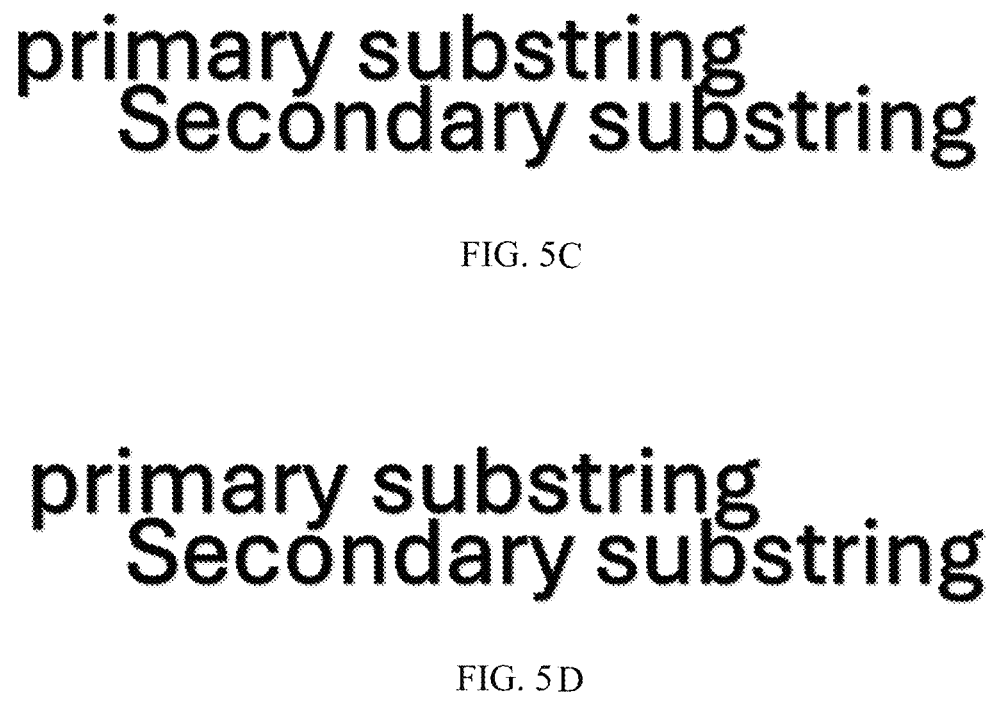

According to another embodiment, the adaptation is a change in the width of the selected text string or a portion thereof. For example, as shown in FIG. 5C to FIG. 5D, the adaptation is increasing the width of the text string by 1 mm. It should be appreciated that such an adaptation can also be applied to an object or a portion thereof.

Figures 5E, 5F:
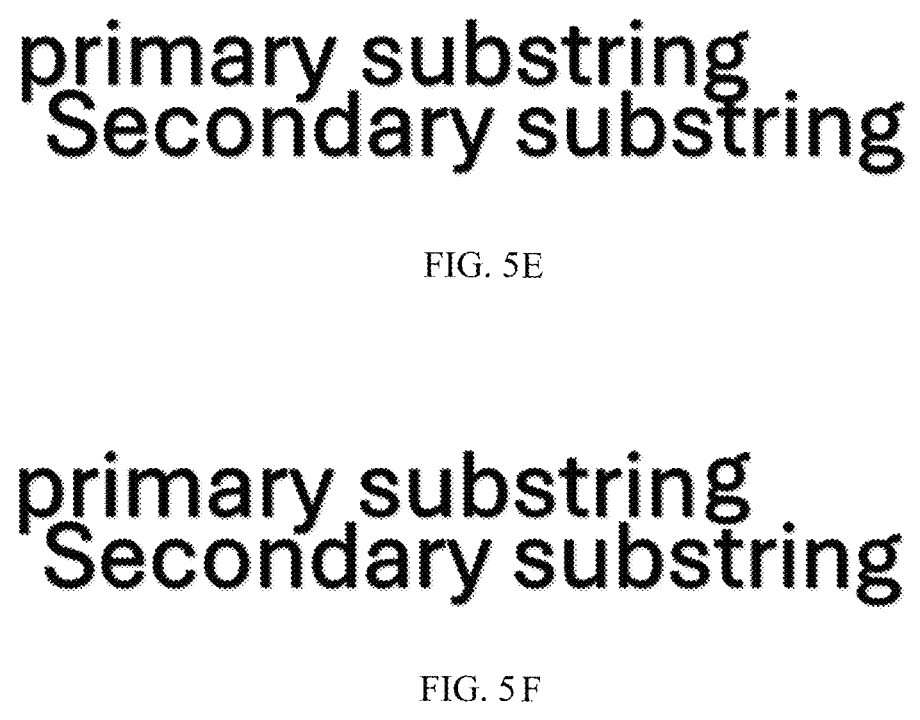

According to another embodiment, the adaptation is a change in the height of the selected text string or a portion thereof. For example, as shown in FIG. 5E to FIG. 5F, the adaptation is increasing the height of the text string by 1 mm or increasing the height of a character of the text string by 1 mm. It should be appreciated that such an adaptation can also be applied to an object or a portion thereof.

Figures 5G, 5H:
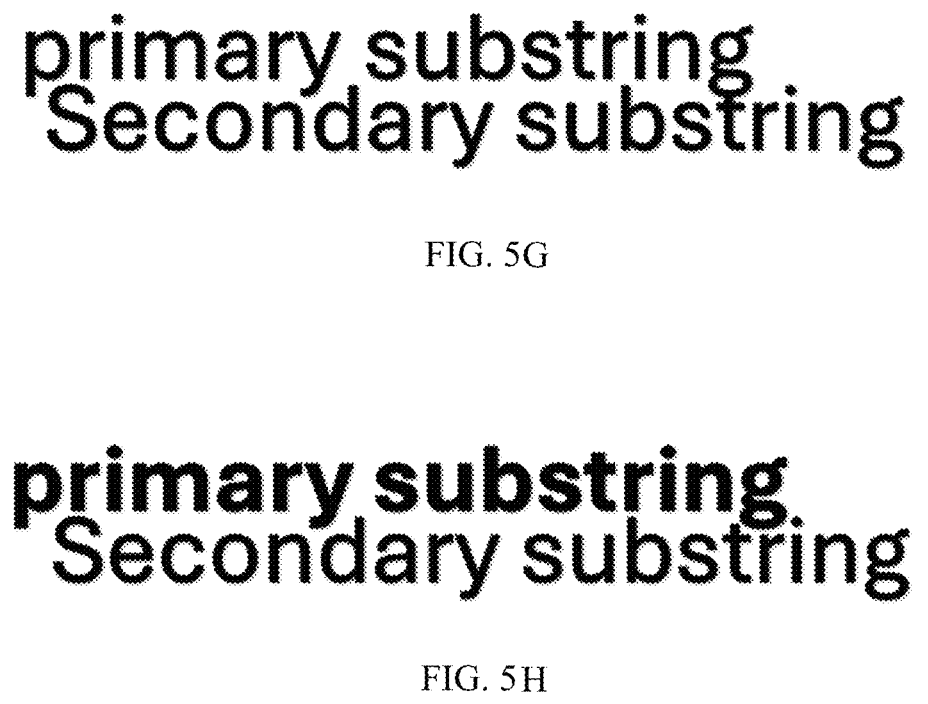

According to another embodiment, the adaptation is emphasizing the selected text string or a portion thereof. For example, as shown in FIG. 5G to FIG. 5H, the adaptation is bolding the text string. It should be appreciated that such an adaptation can also be applied to an object or a portion thereof.

Figures 5I, 5J:
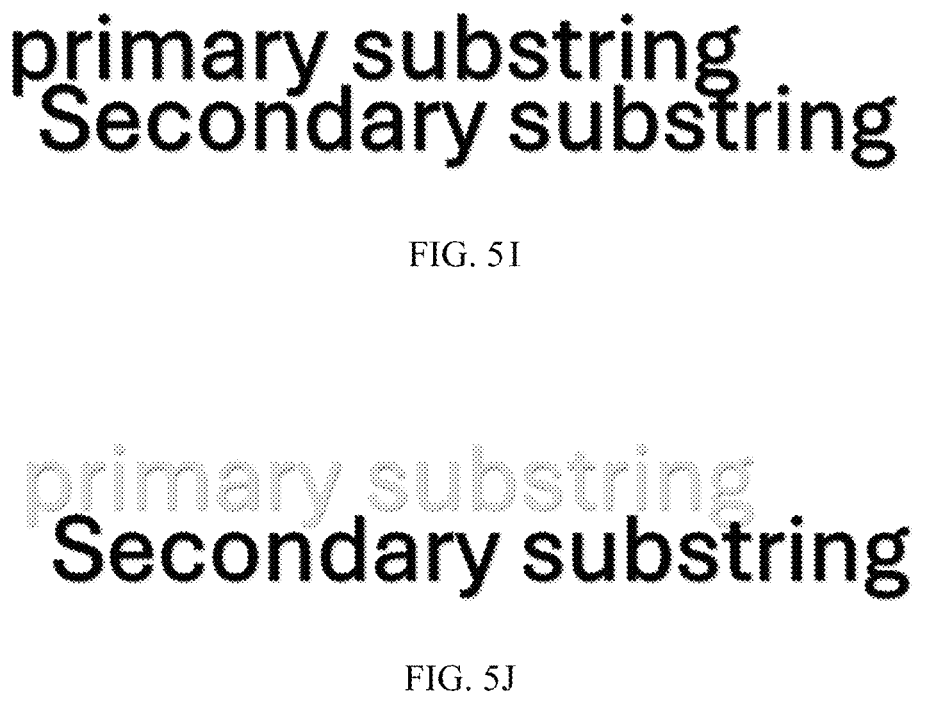

According to another embodiment, the adaptation is deemphasizing the selected text string or a portion thereof. For example, as shown in FIG. 5I to FIG. 5J, the adaptation is fading the text string. It should be appreciated that such an adaptation can also be applied to an object or a portion thereof.

Figures 5K, 5L:
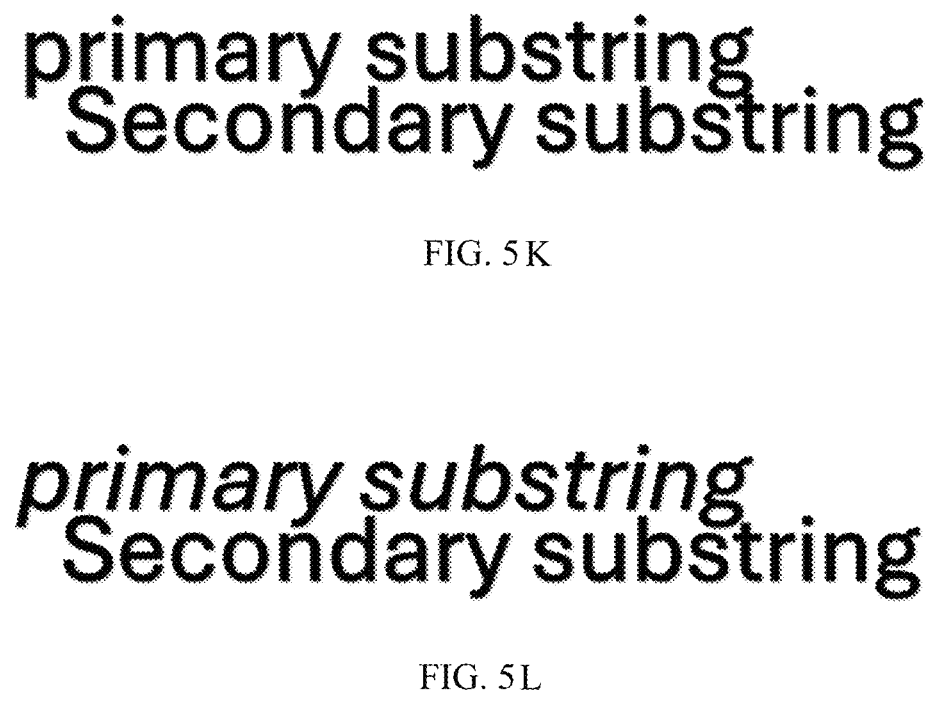

According to another embodiment, the adaptation is changing a Style of the selected text string or a portion thereof. For example, as shown in FIG. 5K to FIG. 5L, the adaptation is italicizing the text string. Other stylistic adaptations include, but are not limited to: Bold Formatting-making the selected text string bold to distinguish it from its associated content; Underline or Strikethrough-adding an underline or strikethrough to the selected text string; Text Shadow-adding a shadow effect to the selected text string; Outline-applying an outline or stroke around the characters of the selected text string; Opacity Adjustment-making the selected text string more opaque while making its associated content slightly transparent; Color Contrast-using a color for the selected text string that contrasts strongly with the associated content, such as white text over a dark background or complementary colors; Highlighting-adding a highlight background or glow effect around the selected text string; Font Size Adjustment-increasing or decreasing the font size of the first text string relative; Font Style Change-using a different font family or typeface (e.g., sans-serif vs. serif) for the selected text string; Kerning and Tracking-adjusting the spacing between characters of the selected text string; Line Thickness-increasing the stroke weight of the selected text string to make it more prominent; Dynamic Visual Effects-adding a subtle animation (e.g., blinking or pulsing) to the first text string to draw attention; Transparency Gradient-applying a gradient transparency effect to the overlapping portions of the associated content, giving priority to the selected text string; Layer Priority-adding a visual priority to the first text string, such as embossing or layering it above the second text string; Color and Highlight Combination-combining a contrasting text color with a background highlight or glow to enhance both the selected text string and the surrounding space; Contrast Enhancer-using software-based clarity tools to dynamically adjust contrast between the overlapping text strings in real-time. It should be appreciated that such an adaptation can also be applied to an object or a portion thereof.

Figures 5M, 5N:
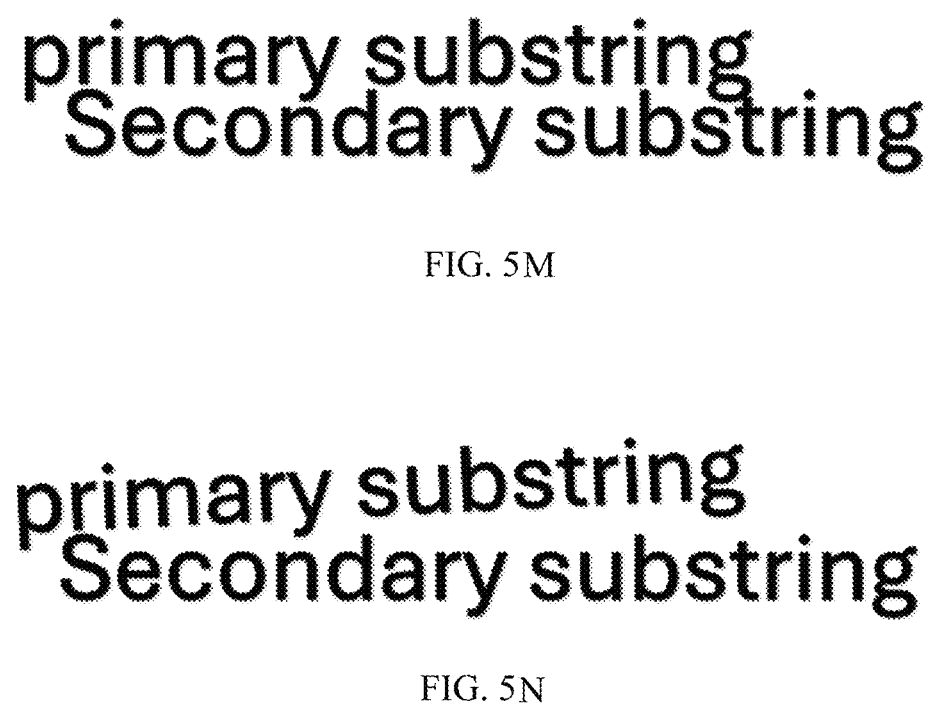

According to another embodiment, the adaptation is rotating the selected text string or a portion thereof. For example, as shown in FIG. 5M to FIG. 5N, for a text string having a horizonal baseline, the adaptation is rotating the selected text by 5 degrees such that the baseline extends from the bottom left to the top right. It should be appreciated that such an adaptation can also be applied to an object or a portion thereof.

Figures 5O, 5P:
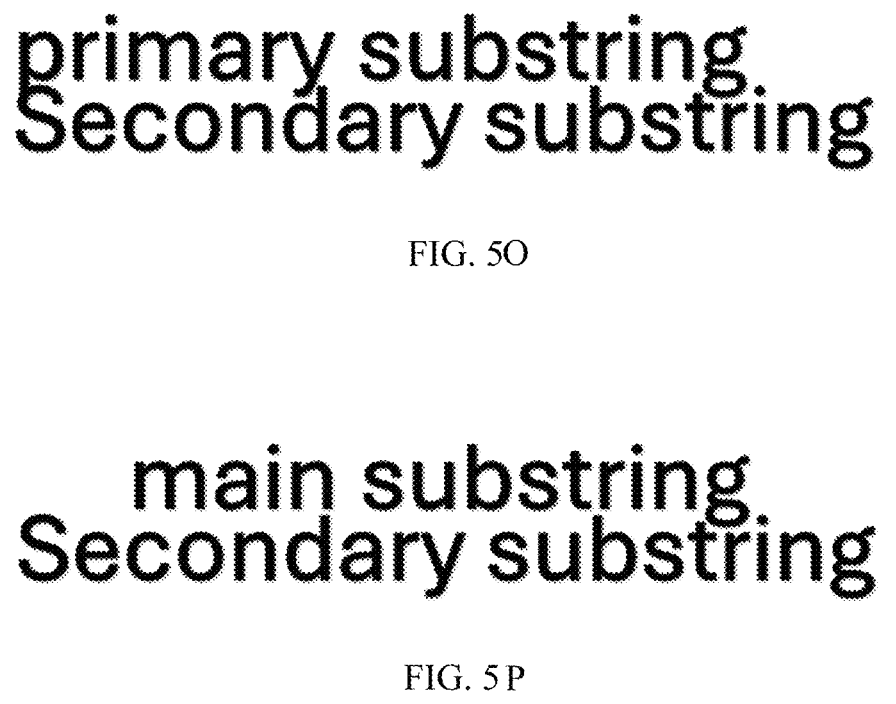

According to another embodiment, the adaptation is replacing an original word or words in the selected text string with a new word or words. For example, as shown in FIG. 5O to FIG. 5P, the adaptation is replacing "primary" with "main". Preferably, the new word or words are a synonym of the original word or words. It should be appreciated that a similar adaptation can also be applied to an object or a portion thereof (e.g., replacing a cat with another cat or replacing one card in a hand of playing cards with another card).

According to another embodiment, the adaptation is, when a placement of the received text string is above its translation such that a descender line of the text string is below an ascender line of the translation, moving the text string below its translation such that an ascender line of the text string having the adaptation is above a descender line of the translation.

According to another embodiment, the adaptation is, when the placement of the received text string is below its translation such that an ascender line of the text string is above a descender line of the translation, moving the text string above its translation such that a descender line of the text string having the adaptation is below an ascender line of the translation.

According to another embodiment, when a placement of the text string is entirely within a top half or bottom half of the image, the adaptation is increasing a width of a portion of the text string.

According to another embodiment, when the placement of the text string is entirely within a left half or right half of the image, the adaptation is increasing a height of a portion of the text string.

It should be appreciated that the adaptation can be a combination of adaptations. For example, the adaptation is a change in the x-position of the selected text string, a change in the height of the selected text string, and a change in the font of the selected text string, all applied simultaneously.

It should be appreciated that the clarity scoring method can be applied to two overlapping objects. For example, an adaptation can be selected for one or both objects in order to improve the combined clarity score of both objects.

Preferably, the selected text string having the adaptation overlaps the airspace of its associated content. Maintaining the overlap between the adapted text string and the airspace of its associated content results in improved contextual association (e.g., the adapted text string maintains a visual and spatial connection to its associated content), which enhances the reader's ability to perceive and associate the two elements together. Additionally, maintaining the overlap minimizes the need for additional display space, which is particularly advantageous in compact or dense layouts.

Alternatively, the selected text string having the adaptation overlaps the body of its associated content. Maintaining the overlap between the adapted text string and the body of its associated content enhances the emphasis (e.g., the emphasis on the association between the adapted text string and its associate content). Additionally, maintaining the overlap ensures that the adapted text string reinforces the visibility or meaning of the associated content, especially in cases where the content might otherwise be overlooked.

Yet alternatively, the selected text string, the selected text string having the adaptation, the associated content, the associated content having the adaptation, or any combination thereof is entirely within a designated area of the electronic display such that no portion of the selected text string, the selected text string having the adaptation, the associated content, the associated content having the adaptation, or any combination thereof protrudes out of the designated area. The designated area can be selected by the user. Alternatively, the designated area can be automatically defined by the calculation module 318 such that the designated area represents the portion of the electronic display around the selected text string and its associated content in which there are no other text strings or objects. For example, as shown in FIG. 6A to FIG. 6B, the calculation module 318 automatically defines the designated area (outline illustrated with grey lines) around "primary substring" and its associated content "secondary substring". Maintaining the adapted text string within the designated area results in a clear layout (e.g., a clean and organized appearance, avoiding overlap with unrelated elements that might cause confusion). A user-selected or automatically defined area provides flexibility in design and adapts to specific application needs, ensuring a tailored presentation.

Preferably, any adaptation applied to a text string or object does not change the airspace of the text string or object (e.g., changing the color or pattern of a text string does not change its topmost, bottommost, leftmost, and rightmost point). Alternatively, any adaptation applied to a text string or object does not increase the airspace of the text string or object (e.g., shrinking the text string does not make its topmost point higher, its bottommost point lower, its leftmost point further left, and its rightmost point further right).

In some embodiments, steps 414-418 are repeated one or more times. For example, in a first iteration, moving the selected text string 1 mm to the left results in a higher combined clarity score, so the selected text string is moved 1 mm to the left. In a second iteration, moving the selected text string 1 mm to the left results in a higher combined clarity score, so the selected text string is moved 1 mm to the left. In a third iteration, moving the selected text string 1 mm to the left does not result in an increased clarity score, so the selected text string is not moved and the method 400 proceeds to step 420. As shown here, a given adjustment is repeated until a local maximum in the combined clarity score is achieved.

In some embodiments, steps 414-418 are repeated one or more times. For example, in a first iteration, a plurality of x-positions for the selected text string are tested and it is determined that moving the selected text string 1 mm to the left results in the greatest increase in the combined clarity score, so the selected text string is moved 1 mm to the left. In a second iteration, a plurality of font sizes for the selected text string are tested and it is determined that a 12 point font for the selected text string results in the greatest increase in the combined clarity score, so the font size of the selected text string is changed to 12 point font. In a third iteration, a plurality of fonts for the selected text string are tested and it is determined that Calibri for the selected text string result in an increase in the combined clarity score, so the font of the selected text string is changed to Calibri. There are no more types of adjustments to test so the method 400 proceeds to step 420. As shown here, a first-type adjustment is optimized in the first iteration, a second-type adjustment is optimized in the second iteration, and a third-type adjustment is optimized in the third iteration.

In some embodiments, the system 300 incorporates the following functionalities:

Dynamic contextual adaptation-Machine learning algorithms analyze user behavior and preferences, dynamically adapting the text display Style (e.g., font size, color contrast, or offset positioning) to maximize readability or impact.

Context-aware text formatting—the background or second text adjusts to align with real-time content themes or environmental lighting conditions.

Advanced embedding mechanisms-dynamic embedding techniques are used to more fluidly blend the characters of the first text more with the second text, improving aesthetics and visual impact. For example, using gradient or animated blending effects between the embedded text layers, making them visually engaging and attention-grabbing.

Augmented reality (AR) Integration the system 300 can function in AR environments, where text can be displayed in 3D with enhanced depth perception, offset text shadowing, or interactive manipulation. AR features can allow users to physically move their viewpoint to reveal additional hidden text or deeper layers of meaning.

Multi-sensory feedback-Haptic feedback or audio cues are tied to text interaction, enhancing the user's multisensory experience and making the system accessible to visually impaired users.

Interactive user control-Customization features allow users to tweak the adaptation (e.g., offset, transparency, or text alignment) through an intuitive interface. Gesture-based controls can be used for hands-free adjustments in dynamic display environments, such as VR or AR settings.

Accessibility enhancements—The system 300 offers a mode that optimizes the display for individuals with dyslexia or other reading difficulties by customizing the character offset, color schemes, or text spacing. (eye movement is tracked to determine one or more adaptations that result in an increased reading speed—an optimal adaptation maximizes reading speed. This can be applied to a single text string. AI can be used for personalized optimization). Real-time translation or symbol substitution can be incorporated for multilingual accessibility.

Automated formatting rules—AI-powered tools can automatically determine the optimal placement and orientation of text based on content type and viewing medium. Through the real-time testing of various layouts with users, data is gathered to refine future configurations.

Interactive storytelling—adaptations are dynamically applied to a text string or object such to reveal plot twists or thematic shifts.

Real-time feedback system—the system continuously monitors user interaction (e.g., using eye tracking or mouse movements) to refine adaptations in real time.

Dynamic font adjustments—adaptive font rendering techniques are incorporated, where font weights, line thickness, and kerning are dynamically adjusted to improve clarity without changing word choice or positioning.

Context-based adaptation selection—a machine learning model or a classification scheme is used to choose adaptations based on contextual factors such as the type of associated content (e.g., translation, image, or video) and the ambient environment (e.g., lighting conditions).

Perceptual quality enhancement—clarity scores can be based on, at least in part, perceptual quality metrics (e.g., based on human visual system models) for more user-centric optimization.

Layered rendering with visual effects—Adaptations can include subtle shadowing, highlighting, or background blurring effects to enhance the distinction between the text string and associated content.

Interactive user control—users can interactively modify the adaptation parameters (e.g., they can reposition the text or manually select synonyms) through a user interface.

Hierarchical adaptation system—The system 300 uses a tiered approach to selecting adaptations. A tiered approach to selecting adaptations is advantageous because it prioritizes solutions that maintain visual and contextual consistency while progressively addressing clarity issues. Some benefits include:

Disruption to visual aesthetics is minimized when the least visual change is prioritized: By starting with adaptations like font changes, the system ensures that the overall layout and design remain as close as possible to the original, preserving user experience and design intent. Readability and familiarity is maintained because small, incremental changes are less likely to confuse users or detract from the intended message. Prioritizing minor changes allows the system to achieve clarity improvements with minimal computational overhead, as these adaptations are often faster and easier to compute (e.g., adjusting font weight or size versus re-generating semantic content). Adaptations that require significant processing (e.g., semantic modifications) are used only when simpler solutions fail, conserving computational resources. By relegating modifications such as word replacements to a lower priority, the system avoids altering the underlying meaning of the text unless absolutely necessary. Using semantic changes as a last result is critical in contexts like legal, medical, or technical documents where precision is vital.

The tiered approach allows the system to address issues based on the severity of the clarity problem and the specific display environment, ensuring an optimal balance between aesthetics and functionality. Users are more likely to accept subtle changes, such as font modifications, compared to drastic positional or semantic changes that might distract or confuse them.

Example Workflow:

Font changes are considered first (e.g., adjusting the font Style, size, or weight to enhance clarity without altering layout or meaning). Positional changes are considered second (e.g., adjusting the placement of text within the layout to avoid overlap or improve contrast). Semantic modifications are considered third (e.g., replacing words or phrases only when other options fail to resolve clarity issues). By systematically escalating the type of adaptation, a hierarchical system ensures clarity is achieved with minimal impact, prioritizing user experience, computational efficiency, and semantic fidelity.

Advanced image content recognition—for cases where the associated content is an image, improve clarity by defining (manually or automatically) or recognizing regions of interest (e.g., faces, landmarks) and ensuring the text string avoids those areas or complements them.

Integration with augmented reality (AR)—The system 300 can incorporate an AR headset, ensuring clarity optimization is applied to text overlays on live video or 3D environments.

Multi-language support—enhance translation scenarios by integrating language-specific readability models, ensuring that adaptations are culturally and linguistically appropriate.

Temporal adaptation for videos—when the associated content includes moving images (e.g., video), the text string can be dynamically adjusted in each frame based on scene changes or object movements.

Accessibility features—adaptations can be tailored for users with visual impairments, such as increasing contrast, using larger fonts, or applying high-contrast color schemes.

Support for complex content—It should be appreciated that the clarity scoring method of this invention can be applied to content beyond text and objects (e.g., the clarity of interactive diagrams, charts, or 3D models can be improved through strategic adaptations).

Gamified testing for improvements—users can test different adaptation strategies and provide feedback, improving the clarity algorithms over time.

Memory-based adaptation—The system 300 can remembers user preferences or previous adaptations for recurring content, reducing processing time and improving user satisfaction.

Region-based adaptations—the display can be divided into adaptable regions, allowing for different adaptation strategies depending on where the text overlaps the associated content.

Dynamic text effects—the adaptation includes the addition of a drop shadow, outline, or glow can be around the text to enhance its visibility against complex backgrounds. The adaptation can be a gradually fade text into the background to highlight certain words or maintain focus on the associated content.

Dynamic font changes—the adaptation can be selecting a different font optimized for readability in specific scenarios (e.g., sans-serif fonts for digital screens or specialized dyslexia-friendly fonts).

Variable font thickness—the adaptation can be changing the thickness of individual characters for better contrast against the background.

Adaptive anchoring—the adaptation is moving the text string to an area of the associated content with lower visual complexity.

Text rotation or skewing—the adaptation is rotating or skewing the text to avoid overlapping critical parts of the associated content.

Letter spacing (e.g., tracking)—the adaptation is increasing or decreasing the spacing between characters for enhanced readability.

Word spacing (e.g., kerning)—the adaptation is adjusting the spacing between specific letter pairs to reduce overlap or improve balance.

Line breaking or splitting—the adaptation is dividing longer text strings into multiple lines or fragments to reduce clutter.

Text warping—the adaptation is curving or wrapping the text string around prominent features of the associated content.

Simplification—the adaptation is replace complex words or phrases in the text string with simpler synonyms for improved readability.

Keyword emphasis—the adaptation is highlighting critical words (e.g., bold or italic) in the text string to direct user focus without changing the associated content.

Blurring—the adaptation is applying a Gaussian blur or similar effect to the associated content behind the text string.

Color inversion—the adaptation is temporarily inverting the background colors where the text overlaps for enhanced contrast.

Semi-transparent backgrounds—the adaptation is the addition of a translucent "text box" behind the text string to separate it visually from the associated content.

Highlight regions—the adaptation is highlighting specific parts of the associated content related to the text string for better correlation.

Layered content reduction—the adaptation is removing or dimming non-critical elements of the associated content.

Edge detection filtering—the adaptation is emphasizing edges in the associated content to avoid obscuring text with uniform regions.

Dynamic recoloring—the adaptation is adjusting the color of both the text and overlapping content to enhance their distinction while maintaining aesthetics.

Clarity zones—the adaptation is placing the text string in clarity zones, areas of the associated content where the text string can be freely placed without major loss of recognizability.

Focus and depth of field—the adaptation is using a shallow depth of field effect to focus on the text string while blurring surrounding content.

Motion-based adaptation—the adaptation is the addition of subtle animations to the text string or its associated content, such as pulsing or sliding, to naturally draw user attention without overwhelming them.

Text transparency gradient—the adaptation is applying a gradient effect to text opacity, fading portions of the text string that overlap critical areas of the associated content.

FIG. 7 is a flowchart showing steps of an exemplary method 700 of displaying a text string and associated content.

At step 702, the contents of an electronic display, or a portion thereof, are scanned and converted into a digital image. Alternatively, a saved digital image (e.g., a PNG, JPEG, or PDF) is provided by the user.

At step 704, the character recognition module 315, working in conjunction with the calculation module 318, identifies text strings within the digital image and defines an airspace for each identified text string.

At step 706, the object recognition module 316, working in conjunction with the calculation module 318, identifies objects within the digital image and defines an airspace for each identified object.

At step 708, an identified text string is selected for clarity improvement. Preferably, the selected text string overlaps an airspace of its associated content, where the associated content is another identified text string or an identified object. Alternatively, the selected text string overlaps the body of its associated content, where the associated content is another identified text string or an identified object.

At step 710, the clarity scoring module 314 calculates a clarity score for the selected text string, a clarity score for the associated content, and a combined clarity score. In a preferred embodiment, the clarity scoring module 314 uses OCR software with confidence scoring, text readability analysis tools, computer vision software with text analysis tools, combined OCR and contrast analysis tools, machine learning models for clarity predictions, or any combination thereof to calculate the clarity score for the selected text string. If the associated content is another text string, the clarity scoring module 314 uses OCR software with confidence scoring, text readability analysis tools, computer vision software with text analysis tools, combined OCR and contrast analysis tools, machine learning models for clarity predictions, or any combination thereof to calculate the clarity score for the associated content. If the associated content is an object, the clarity scoring module 314 can use object detection and recognition software, semantic segmentation tools, feature extraction and comparison tools, saliency detection tools, image quality assessment tools, machine learning models, or any combination thereof to calculate the clarity score of the associated content. The clarity score can be calculated according to the aforementioned methods.

At step 712, the selected text string and its associated content is recreated in a virtual environment.

At step 714, an adaptation is applied to the selected text string within the virtual environment. The adaptation is one that increases the size of the text string. For example, the adaptation is increasing the font size of the selected text string, increasing the width of the text string, increasing the height of the text string, etc. Alternatively, the adaptation is separating a text string and its associated content such that the text string does not overlap the airspace of the associated content or the text string does not overlap the body of the associated content. This can be achieved by placing the text string immediately above or below its associated content.

At step 716, the clarity scoring module 314 calculates a clarity score for the selected text string having the adaptation, a clarity score for the associated content, and a combined clarity score. If the adaptation to the selected text string results in a higher combined clarity score (e.g., for the selected text string and its associated content, the combined clarity score is higher in the recreated digital image than in the original digital image received in step 702), the method 700 proceeds to step 718. If the adaptation to the selected text string does not result in a higher combined clarity score, no further action is taken.

At step 718, the digital image is recreated in a virtual environment with the selected text string having the adaptation.

At step 720, the calculation module 318 determines if the selected text string having the adaptation and/or its associated content overlaps the airspace of any other text and/or object on the digital image. Alternatively, the calculation module 318 determines if the selected text string having the adaptation and/or its associated content overlaps the body of any other text and/or object on the digital image. If yes, the method 700 proceeds to step 722. If no, no further action is taken.

At step 722, an adaptation is applied to one or more other texts and/or objects the selected text string within the virtual environment. The adaptation is one that decreases the size of the one or more other text strings and/or objects.

At step 724, the calculation module 318 determines if the selected text string having the adaptation and/or its associated content still overlaps the airspace of any other text and/or object on the digital image. Alternatively, the calculation module 318 determines if the selected text string having the adaptation and/or is associated content still overlaps the body of any other text and/or object on the digital image. If yes, the method 700 proceeds to step 722. If no, the method proceeds to step 726.

At step 726, the renderer 324 renders the selected text string having the adaptation, its associated content, and the one or more texts and/or other objects having the adaptation(s) for display on the electronic display.

At step 728, the rendered selected text string having the adaptation, its associated content, and the one or more texts and/or other objects having the adaptation(s) are displayed on the electronic display.

Figures 8A, 8B:
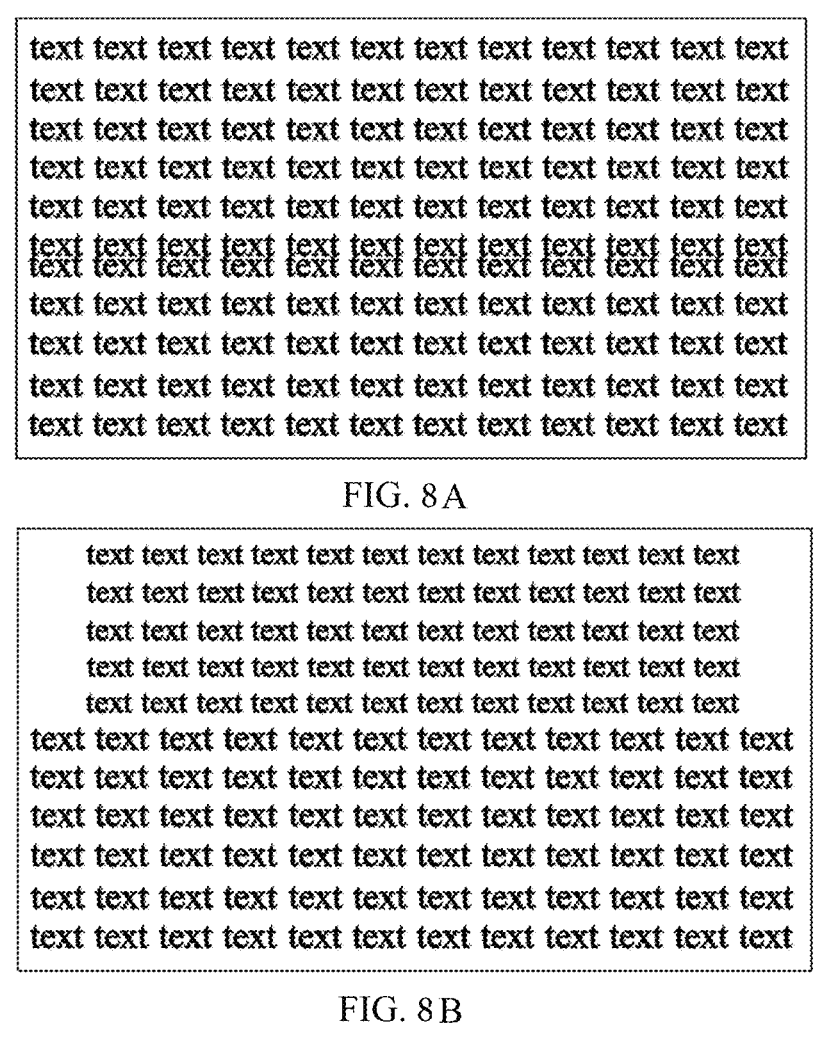

According to an embodiment, when the selected text string and its associated content are two text strings that are part of a main text, the adaptation to the one or more other texts and/or objects is reducing the size of a portion of the main text that precedes the selected text string and its associated content. For example, the adaptation can be reducing the font size of the portion of the main text such that an extra line of blank space forms between the selected text string and the portion of the main text. Such adaptations provide room for the selected text string having the size-increasing adaptation. For example, FIG. 8A shows a text in which a text string overlaps another text string. FIG. 8B shows a display in which the overlapping text strings have been separated (a size-increasing adaptation to the selected text string) and a portion of the main text preceding the selected text is displayed in a smaller font (a size-decreasing adaptation to the selected text string).

Alternatively, when the selected text string and its associated content are two text strings that are part of a main text, the adaptation to the one or more other texts and/or objects is reducing the size of a portion of the main text that comes after the selected text string and its associated content.

Yet alternatively, when the selected text string and its associated content are two text strings that are part of a main text, the adaptation to the one or more other texts and/or objects is reducing the size of a portion of the main text that comes before the selected text string and its associated content and reducing the size of a portion of the main text that comes after the selected text string and its associated content.

In some embodiments, size-reducing adaptations are only applied to other text strings and/or objects in designated areas of the electronic display. The designated area can be selected by the user. Alternatively, the designated area can be automatically defined by the calculation module 318 such that the designated area represents the portion of the electronic display that contain other texts and/or objects that are not the main focus of the user. For example, 9A shows a display in which two overlapping texts are surrounded by other texts. 9B shows a display in which the user has designated two areas on the display (the grey rectangles). 9C shows a display in which the two overlapping texts have been separated (a size-increasing adaptation) and the other texts in the two designated areas are displayed in a smaller font (a size-decreasing adaptation).

Figure 10:
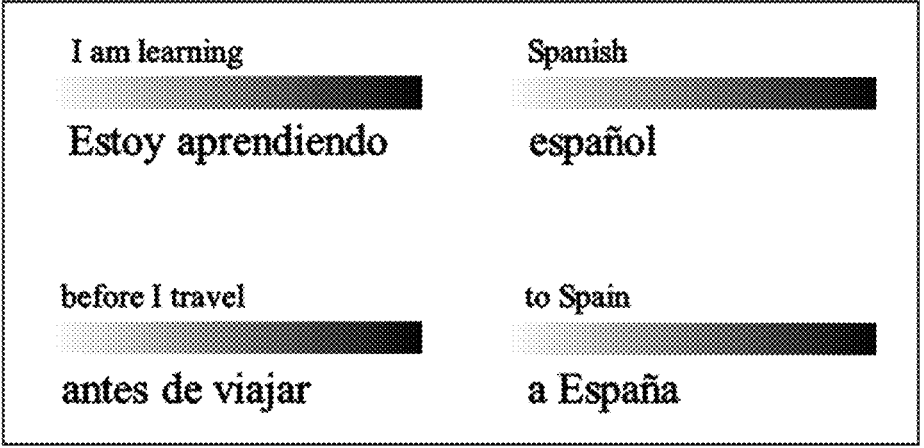
FIG. 10 shows demarcated substring pairs, according to an embodiment.

FIG. 10 shows demarcated substring pairs, according to an embodiment. Here, the demarcations are rectangles positioned in between the English and Spanish substrings. Each rectangular element has a gradient fill, transitioning from a darker shade on one side to a lighter shade on the opposite side. The direction and positioning of the gradient are configured to ensure that the darker side of the rectangle aligns with regions of the display that are otherwise devoid of text or other graphical elements. This alignment minimizes luminance imbalances and enhances the visual uniformity of the display by distributing black-and-white contrast more evenly. Determining the gradient's orientation may include steps of: Screen Analysis-based on a digital image of the display screen, evaluating the spatial distribution of text and white space to identify regions of luminance imbalance; Gradient Placement: Orienting the gradient such that its darker side is located towards areas of excessive white space, thereby increasing visual contrast in those areas.

Dynamic Adjustment (optional): In displays capable of dynamic rendering, the gradient orientation may be adjusted in real-time based on the current layout of text and graphical elements.

This design ensures a more balanced distribution of light and dark regions across the display, reducing visual strain and enhancing readability.

Furthermore, demarcating two text substrings with the same demarcation strengthens a visual association among text substrings within that demarcation. For both text strings, the defined substructures are phrases and the defined superstructures are sentences.

Figure 11:
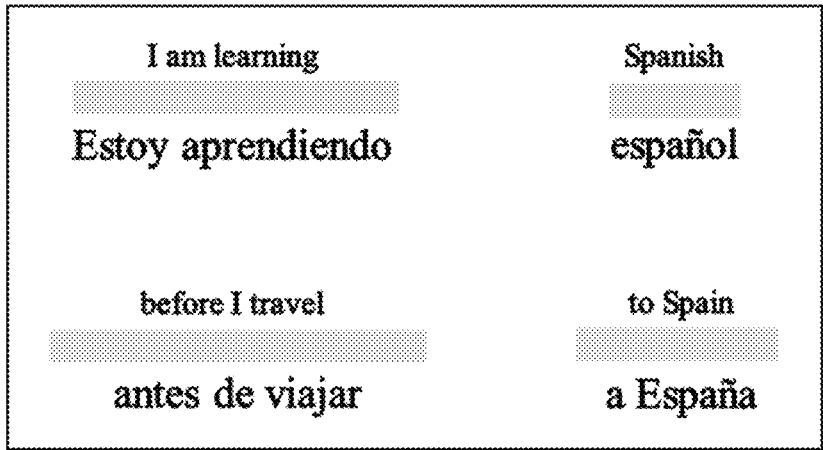
FIG. 11 shows demarcated substring pairs, according to an embodiment.

FIG. 11 shows demarcated correspondence units in which the demarcations are gray rectangles. Here, the leftmost point of each demarcation is flush with or to the left of the leftmost point of the correspondence unit, and the rightmost point of the demarcation is flush with or to the right of the rightmost point of the correspondence unit.

Figures 12, 13:
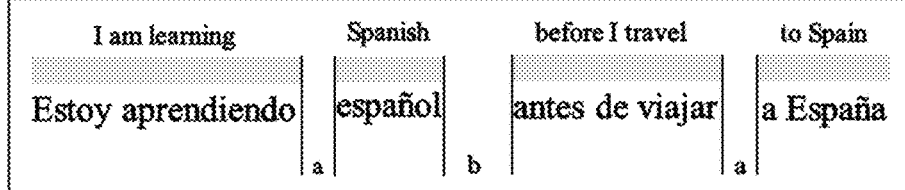
FIG. 12 shows demarcated substring pairs, according to an embodiment.
FIG. 13 shows demarcated substring pairs, according to an embodiment.

FIG. 12 shows English substrings of "I am learning", "Spanish", "before I travel", and "to Spain" over their corresponding Spanish substrings of "Estoy aprendiendo", "español", "antes de viajar" and "a España". Each substring pair is demarcated with a light grey rectangle. There is a first spacing 'a' in between adjacent demarcations corresponding to the primary substrings belonging to the same structural unit (e.g., Here, the Spanish substrings of "Estoy aprendiendo" and "español" are part of a same structural unit. Their corresponding demarcations are separated by a first spacing 'a'). There is a second spacing 'b' in between adjacent demarcations corresponding to the secondary substring belonging to a different structural unit (e.g., Here, the Spanish substrings of "español" and "antes de viajar" are part of different structural units. Their corresponding demarcations are separated by a second spacing 'b'). Preferably, 'b' is wider than 'a'. Alternatively, a width of the first spacing 'a' is not equal to a width of the second spacing 'b'. Such a spacing between demarcations defines substructures and superstructures of substring pairs. No matter how far the English is horizontally offset, there is a consistent break between demarcations that reinforces the correspondence between substrings. Furthermore, a small spacing creates an illusion of closeness among adjacent demarcated substring pairs.

For quadrilateral demarcations (e.g., parallelograms), angles for the left and right sides of the parallelogram (the inside angle between a side and the bottom of the parallelogram), can be selected to achieve desired results on the display. For example, if the parallelogram has acute angles (<90°), it can give the impression of depth or that the demarcation is receding into the distance, similar to a perspective projection. If the parallelogram has obtuse angles (>90°), it may look like it is coming forward, creating a protruding or raised effect.

When the edges are angled asymmetrically (e.g., one side slanting more than the other), the parallelogram can guide the viewer's eye to a focal point, emphasizing a particular part of the text or creating a sense of movement. A balanced taper can make the parallelogram appear to taper into a vanishing point, contributing to a sense of depth.

If the parallelogram is paired with gradient shading or slight color shifts along its edges, the angles can make it appear as a tilted 3D surface, such as a plaque or a platform hovering between the two texts.

Using angles combined with shadow effects can make the parallelogram look like a separate layer, physically positioned between the two text layers. This creates the illusion that the translation and original text are on different planes.

Using 45° angles for the quadrilaterals creates a clean, symmetric appearance that is easy to read and aesthetically neutral. Using 30° or 60° angles adds more dramatic depth, emphasizing a futuristic or dynamic aesthetic. Using unequal angles (e.g., 70° and 110° angles) suggests directionality, such as upward or downward movement, depending on the slant.

FIG. 13 shows English substrings of "I am learning", "Spanish", "before I travel", and "to Spain" over their corresponding Spanish substrings of "Estoy aprendiendo", "español", "antes de viajar" and "a España" to form substring pairs. There is a first spacing 'a' in between adjacent Spanish substrings belonging to the same superstructure (e.g., Here, the Spanish substrings of "Estoy aprendiendo" and "español" are part of the same superstructure. Likewise, the Spanish substrings of "antes de viajar" and "a España" are part of the same superstructure). Each superstructure is demarcated with a grey rectangular demarcation. Each superstructure is demarcated with a grey rectangular demarcation. There is a second spacing 'b' in between the demarcations, indicating that the substrings within each demarcation are part of a different superstructure (e.g., Here, the Spanish substrings of "español" and "antes de viajar" are part of different superstructures). Such a spacing between substrings and demarcations defines substructures and superstructures of substring pairs. Preferably, 'b' is wider than 'a'. Alternatively, a width of the first spacing 'a' is not equal to a width of the second spacing 'b'. Preferably, a spacing 'b' in between two demarcations is narrower than the widths of the two demarcations, 'd1' and 'd2'. Preferably, for a line of substring pairs, the sum of the widths of the demarcations, 'd1'+'d2' is at least half of the width of the substring pairs, 'c', where 'c' is the distance between the leftmost and rightmost points of the substring pairs.

According to an embodiment, the background is a different color and/or pattern than the primary and secondary text strings. For example, in 14, the primary text strings are black, the secondary text strings are white, and the background is grey.

According to an embodiment, one of the primary and the secondary text includes torah-related commentary. The commentary can include any language—the commentary explains the meaning of a word or describes the text using other words. Can provide definitions for key words.

According to an embodiment, substring pairs are demarcated with parallelogram demarcations. When a width of the secondary substring exceeds a predetermined width, the secondary substring can be split into two or more lines. The bottommost line of the secondary substring, or a portion thereof, is within the demarcation. A base line of an immediately above line of the secondary substring is flush with the top of the parallelogram demarcations. For example, as shown in 14A, the secondary English substrings not split into two lines are completely or mostly within the grey parallelograms. For secondary English substrings split into two lines, the bottom lines are completely or mostly within the grey parallelograms while the immediately above lines are completely or mostly above the grey parallelograms.

Alternatively, when the secondary substring is not split into two or more lines, the secondary substring is vertically centered within the parallelogram demarcation. When the secondary substring is split into two or more lines, both lines, or a portion of both lines, is within the demarcation. For example, as shown in 14B, the secondary English substrings not split into two lines are vertically centered within the grey parallelograms. For the secondary English substring split into two lines, both lines are completely or mostly within the grey parallelograms.

Figure 14A:
FIG. 14A to FIG. 14B show demarcated substring pairs, according to an embodiment.
Figure 14:

In FIG. 14A to FIG. 14B, the Hebrew substrings are the primary substrings which are the primary focus and the English substrings are the secondary substrings which are the secondary focus. Secondary substrings split into two or more lines can be offset to the right of their corresponding primary substrings (e.g., the English substrings are offset to the right of the Hebrew substrings in FIG. 14A to FIG. 14B), placed over their corresponding primary substrings, offset to the left of their corresponding primary substrings, or any combination thereof.

For secondary substrings split into two or more lines, the rightmost point of the upper line can be to the right of the rightmost point of an immediately below line (e.g., for English substrings split into two lines in FIG. 14A to FIG. 14B, the rightmost point of the upper line is to the right of the rightmost point of the immediately below line), the rightmost point of the upper line can be flush with the rightmost point of an immediately below line, or the rightmost point of the upper line can be to the left, of the rightmost point of an immediately below line. Alternatively, the leftmost point of the upper line can be to the right of the leftmost point of an immediately below line, the leftmost point of the upper line can be flush with the leftmost point of an immediately below line, or the leftmost point of the upper line can be to the left, of the rightmost point of an immediately below line. Alternatively, for secondary substrings split into two or more lines, the upper line can be horizontally offset to the right of an immediately below line, the upper line can be horizontally flush with an immediately below line, or the upper line can be horizontally offset to the left of an immediately below line.

According to an embodiment, for all substrings in a substring pair, the right most point of an upper substring can be to the right of the rightmost point of an immediately below substring (e.g., for substring pairs containing two English substrings and one Hebrew substring in 14A to 14B, the rightmost point of the upper English substring is to the right of the rightmost point of the immediately below English substring and the rightmost point of the immediately below English substring is to the right of the rightmost point of the immediately below Hebrew substring), the rightmost point of an upper substring can be flush with the rightmost point of the immediately below substring, the leftmost point of an upper substring can be flush with the leftmost point of the immediately below substring, or the leftmost point of an upper substring can be to the left of the leftmost point of an immediately below substring. Alternatively, for all substrings in a substring pair, an upper substring can be horizontally offset to the right of an immediately below substring or an upper substring can be horizontally offset to the left of an immediately below substring.

According to an embodiment, when the rightmost point of an upper substring is to the right of the rightmost point of an immediately below substring for all substrings in a substring pair or when an upper substring is horizontally offset to the right of an immediately below substring for all substrings in a substring pair, the demarcation for that substring pair is skewed to the right (e.g., the grey parallelogram demarcations are skewed to the right in 4A to 4B). Alternatively, when the leftmost point of an upper substring is to the left of the leftmost point of an immediately below substring for all substrings in a substring pair or when an upper substring is horizontally offset to the left of an immediately below substring for all substrings in a substring pair, the demarcation for that substring pair is skewed to the left.

According to an embodiment, secondary substrings are positioned below their corresponding primary substrings. When a width of a secondary substring exceeds a predetermined width, the secondary substring can be split into two or more lines.

According to an embodiment, when the width of a secondary substring exceeds a predetermined width, the secondary substring can be split into two or more lines with at least one of the lines positioned above its corresponding primary substring and at least one of the lines positioned below its corresponding primary substring (e.g., FIG. 15 shows English substrings positioned above and below their corresponding Hebrew substrings).

According to an embodiment, when the width of a secondary substring exceeds a predetermined width, the secondary substring can be split into two or more lines and placed to the right or to the left of its corresponding primary substring (e.g., FIG. 16 shows English substrings positioned to the right of their corresponding Hebrew substrings).

Figure 17:
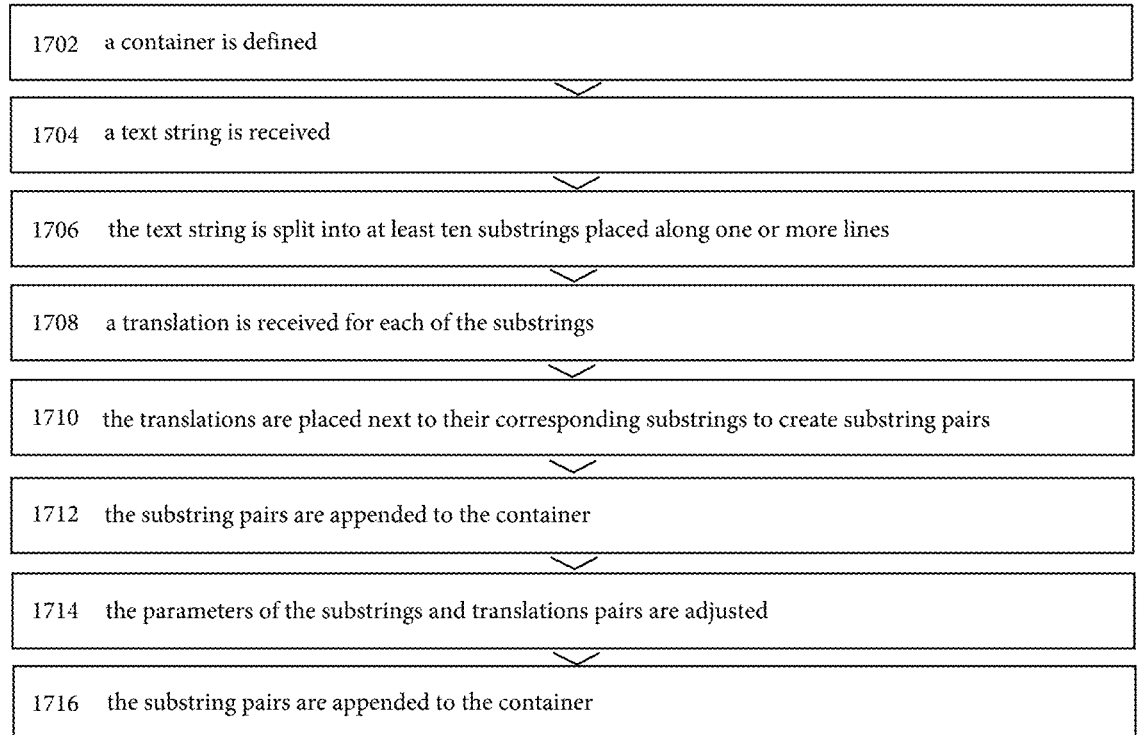
FIG. 17 is a flowchart showing steps of displaying text strings, according to an embodiment.

FIG. 17 is a flowchart showing steps of displaying text strings received by a computing device, according to an embodiment. The method may comprise steps of:

At step 1702, a target portion of the electronic display (container) where the results of the program will be displayed is defined. The size and location of the container depends on factors such as the desired text layout, text characteristics, and demarcation characteristics. Any existing content within this container can be cleared.

At step 1704, a text string is receiving by a processing device within the computing device.

At step 1706, the text string is split into at least ten substrings placed along one or more lines (e.g., based on newline characters (\n) or other identifiers). Alternatively, the text string is split into at least five substrings, into at least eight substrings, into at least ten substrings, into at least twelve substrings, into at least fifteen substrings, or into at least twenty substrings. Each line of text is then processed individually.

At step 1708, a translation is received for each of the substrings.

At step 1710, the translations are placed next to their corresponding substrings to create substring pairs, where each of the substring pairs includes one of the translations and its corresponding substring, each of the translations is only part of one substring pair, and each of the substrings is only part of one substring pair.

At step 1712, the substring pairs are appended to the container.

At step 1714, the parameters of the substrings and translations pairs are adjusted such that at least one of the lines includes a first substring and a second substring such that: a first airspace of the first substring pair vertically overlaps a second airspace of the second substring pair; for a majority of ten consecutive substring pairs, the translation is horizontally offset from its corresponding substring and the translation is vertically offset from its corresponding substring; for each of the substring pairs, the substring pair is positioned entirely within the container; for each substring pair having its translation horizontally offset to the right of its corresponding substring, a center point of the substring pair is to the left of the further left of the rightmost point of an other translation and a rightmost point of an other substring in an other substring pair to the right of the substring pair; for each substring pair having its translation horizontally offset to the left of its corresponding substring, a center point of the substring pair is to the right of the further right of the leftmost point of an other translation and a leftmost point of an other substring in an other substring pair to the left of the substring pair; and for each substring pair having its translation horizontally offset from its corresponding substring, the translation is closer to its corresponding substring than an other substring belonging to an adjacent substring pair, the translation shares a unique appearance characteristic with its corresponding substring and not with the other substring belonging to an adjacent substring pair, or the translation is linked to its corresponding substring using a visual demarcation.

Alternatively, the translation is horizontally offset from its corresponding substring and the translation is vertically offset from its corresponding substring for five or more consecutive substring pairs, for eight or more consecutive substring pairs, for ten or more consecutive substring pairs, for twelve or more consecutive substring pairs, for fifteen or more consecutive substring pairs, and for twenty or more consecutive substring pairs.

According to an embodiment, at least one line of substring pairs is appended to the container at a first time and a remainder of the lines of substring pairs are appended to the container after the first time. Alternatively, each of the lines of substring pairs is appended to the container simultaneously.

According to an embodiment, adjusting the parameters in step 1714 such that, for the majority of ten consecutive substring pairs, the translation is horizontally offset from its corresponding substring, includes steps of: defining leftmost and rightmost points of the translations; defining leftmost and rightmost points of the substrings; defining a reading direction of the substrings; determining, based on the leftmost and rightmost points of the translations, the leftmost and rightmost points of the substrings, and the reading direction of the substrings, if the translation is horizontally offset from its corresponding substring pair for the majority of ten consecutive substring pairs; and, when the translation is not horizontally offset from its corresponding substring for the majority of ten consecutive substring pairs, adjusting a horizontal position of at least one of the translations or substrings such that the translation is horizontally offset from its corresponding substring pair for the majority of ten consecutive substring pairs. Alternatively, when the translation is not horizontally offset from its corresponding substring for the majority of ten consecutive substring pairs, a size or style of at least one of the translations or substrings is adjusted such that the translation is horizontally offset from its corresponding substring pair for the majority of ten consecutive substring pairs.

Likewise, adjusting the parameters such that, for the majority of ten consecutive substring pairs, the translation is vertically offset from its corresponding substring, includes steps of: defining topmost and bottommost points of the translations; defining topmost and bottommost points of the substrings; determining, based on the topmost and bottommost points of the translations, and the topmost and bottommost points of the substrings, if the translation is vertically offset from its corresponding substring for the majority of ten consecutive substring pairs; and, when the translation is not vertically offset from its corresponding substring for the majority of ten consecutive substring pairs, adjusting the horizontal position of at least one of the translations or substrings such that the translation is vertically offset from its corresponding substring pair for the majority of ten consecutive substring pairs. Alternatively, when the translation is not vertically offset from its corresponding substring for the majority of ten consecutive substring pairs, the size or style of at least one of the translations or substrings is adjusted such that the translation is vertically offset from its corresponding substring pair for the majority of ten consecutive substring pairs.

According to an embodiment, adjusting the parameters of the substrings and translations in step 1714 such that, for each substring pair having its translation horizontally offset to the right of its corresponding substring, the center point of the substring pair is to the left of the further left of the rightmost point of the other translation and the rightmost point of the other substring in the other substring pair to the right of the substring pair, includes steps of: defining center points of the substring pairs; defining rightmost points of the translations; defining rightmost points of the substrings; determining, based on the center points of the substring pairs, the rightmost points of the translations, and the rightmost points of the substrings, if the center point of the substring pair is to the left of the further left of the rightmost point of the other translation and the rightmost point of the other substring in the other substring pair to the right of the substring pair for each substring pair having its translation horizontally offset to the right of its corresponding substring; and, when the center point of the substring pair is not to the left of the further left of the rightmost point of the other translation and the rightmost point of the other substring in the other substring pair to the right of the substring pair for each substring pair having its translation horizontally offset to the right of its corresponding substring, adjusting a horizontal position of at least one of the translations or substrings such that the center point of the substring pair is to the left of the further left of the rightmost point of the other translation and the rightmost point of the other substring in the other substring pair to the right of the substring pair for each substring pair having its translation horizontally offset to the right of its corresponding substring; Alternatively, a size or Style of at least one of the translations or substrings is adjusted such that the center point of the substring pair is to the left of the further left of the rightmost point of the other translation and the rightmost point of the other substring in the other substring pair to the right of the substring pair for each substring pair having its translation horizontally offset to the right of its corresponding substring.

According to an embodiment, adjusting the parameters of the substrings and translations in step 1714 such that, for each substring pair having its translation horizontally offset to the left of its corresponding substring, the center point of the substring pair is to the right of the further right of the leftmost point of the other translation and the leftmost point of the other substring in the other substring pair to the left of the substring pair, includes steps of: defining center points of the substring pairs; defining leftmost points of the translations; defining leftmost points of the substrings; determining, based on the center points of the substring pairs, the leftmost points of the translations, and the leftmost points of the substrings, if the center point of the substring pair is to the right of the further right of the leftmost point of the other translation and the leftmost point of the other substring in the other substring pair to the left of the substring pair for each substring pair having its translation horizontally offset to the left of its corresponding substring; and, when the center point of the substring pair is not to the right of the further right of the leftmost point of the other translation and the leftmost point of the other substring in the other substring pair to the left of the substring pair for each substring pair having its translation horizontally offset to the left of its corresponding substring, adjusting a horizontal position of at least one of the translations or substrings such that the center point of the substring pair is to the right of the further right of the leftmost point of the other translation and the leftmost point of the other substring in the other substring pair to the left of the substring pair for each substring pair having its translation horizontally offset to the left of its corresponding substring. Alternatively, a size or Style of at least one of the translations or substrings is adjusted such that the center point of the substring pair is to the right of the further right of the leftmost point of the other translation and the leftmost point of the other substring in the other substring pair to the left of the substring pair for each substring pair having its translation horizontally offset to the left of its corresponding substring.

According to an embodiment, the method further includes steps of monitoring for update conditions and updating the electronic display in real-time when an update condition is met.

FIG. 18 is a flowchart showing steps of displaying text strings received by a computing device, according to an embodiment. The method may comprise steps of:

At step 1802, a text string comprised of at least ten substrings is received by a processing device within the computing device. Alternatively, the text string is comprised of at least five substrings, of at least eight substrings, of at least ten substrings, of at least twelve substrings, of at least fifteen substrings, or of at least twenty substrings.

At step 1804, a translation is received for each of the substrings by the processing device.

At step 1806, the substrings and their corresponding translations are arranged into substring pairs by a placement module, where each of the substring pairs includes one of the substrings and its corresponding translation, each of the translations is only part of one substring pair, and each of the substrings is only part of one substring pair.

At step 1808, the substring pairs are rendered for display rendering by a rendering module, where a first airspace of a first substring pair vertically overlaps a second airspace of a second substring pair; for a majority of ten consecutive substring pairs, the translation is horizontally offset from its corresponding substring and the translation is vertically offset from its corresponding substring; for each substring pair having its translation horizontally offset to the right of its corresponding substring, a center point of the substring pair is to the left of the further left of the rightmost point of an other translation and a rightmost point of an other substring in an other substring pair to the right of the substring pair; for each substring pair having its translation horizontally offset to the left of its corresponding substring, a midpoint of the substring pair is to the right of the further right of the leftmost point of an other translation and a leftmost point of an other substring in an other substring pair to the left of the substring pair; and for each substring pair having its translation horizontally offset from its corresponding substring, the translation is closer to its corresponding substring than an other substring belonging to an adjacent substring pair, the translation shares a unique appearance characteristic with its corresponding substring and not with the other substring belonging to an adjacent substring pair, or the translation is linked to its corresponding substring using a visual demarcation. Alternatively, the translation is horizontally offset from its corresponding substring and the translation is vertically offset from its corresponding substring for a majority of five or more consecutive substring pairs, eight or more consecutive substring pairs, ten or more consecutive substring pairs, twelve or more consecutive substring pairs, fifteen or more consecutive substring pairs, or twenty or more consecutive substring pairs.

At step 1810, the rendered substring pairs are displayed on an electronic display.

According to an embodiment, a non-entire portion of the rendered substring pairs are displayed a first time and a remainder of the rendered substring pairs are displayed after the first time. Alternatively, each of the substring pairs is displayed simultaneously.

Figure 19:
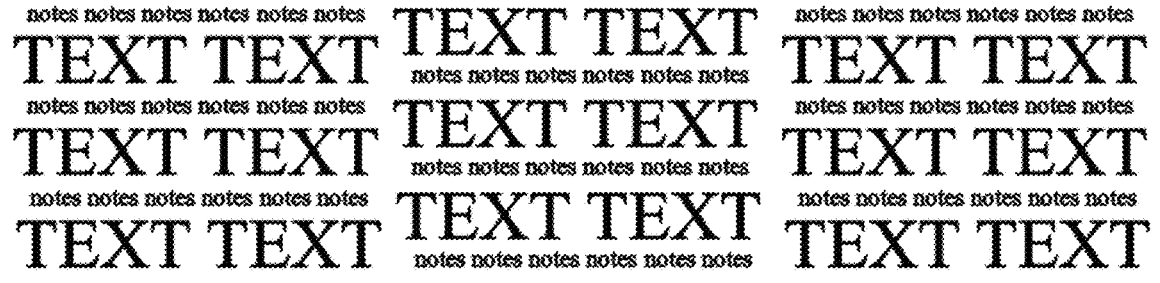
FIG. 19 shows substring pairs, according to an embodiment.

According to an embodiment, as shown in FIG. 19, each line of a text is split into a plurality of substrings. The position of every other substring is adjusted upwards in order to create a space underneath it. If a substring's position is not adjusted, accompanying notes can be placed above that substring. If a substring's position is adjusted, accompanying notes can be placed below this substring. Alternating the placement of the notes helps a reader determine which notes are related to which substrings. This method advantageously preserves the overall layout of the text and the font size of the text. Alternatively, the font size or height of each substring is reduced in order to increase the size of the spaces above and below the substrings. This method advantageously preserves the overall layout of the text.

Methods in this document are illustrated as blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the processes are described is not intended to be construed as a limitation, and any number of the described method blocks can be combined in any order to implement the illustrated method, or alternate methods. Additionally, individual blocks may be deleted from the methods without departing from the spirit and scope of the subject matter described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles. All method steps described within this document may be performed in real-time and automatically by a processer or processors of the system.

We claim:

1. A method of displaying a text string and associated content, the method comprising:

receiving, by a processing device, visual content data representing an associated content renderable into pixel values;

receiving, by the processing device, a text string that overlaps an airspace of the associated content;

calculating, by a clarity scoring module, a baseline combined clarity score using one or more algorithms selected from a group comprising text readability algorithms and text identifiability algorithms, wherein the baseline combined clarity score is based on a baseline clarity score of the text string and a baseline clarity score of the associated content;

recreating, in a virtual environment, a representation of the text string and the associated content;

for each candidate adaptation in a set of one or more candidate adaptations to the text string:

applying, in the virtual environment, the candidate adaptation to the text string, wherein the text string having the candidate adaptation overlaps the airspace of the associated content;

calculating, by the clarity scoring module, a new combined clarity score using one or more algorithms selected from a group comprising text readability algorithms and text identifiability algorithms, wherein the new combined clarity score is based on a new clarity score of the text string having the candidate adaptation and a new clarity score of the associated content;

selecting, by the clarity scoring module, from the set of one or more candidate adaptations, a selected adaptation that yields a new combined clarity score greater than the baseline combined clarity score;

rendering, by a rendering module, the text string having the selected adaptation and the associated content; and displaying, on an electronic display, the text string having the selected adaptation and the associated content.

2. The method of claim 1, wherein the associated content is a translation of the text string.

3. The method of claim 2, wherein the selected adaptation is a change of y-position of the text string or a portion of the text string.

4. The method of claim 3, wherein when a placement of the text string is entirely above its translation such that a descender line of the text string is below an ascender line of the translation, the text string having the selected adaptation is below its translation such that an ascender line of the text string having the selected adaptation is above a descender line of the translation; and when the placement of the text string is entirely below its translation such that an ascender line of the text string is above a descender line of the translation, the text string having the selected adaptation is above its translation such that a descender line of the text string having the selected adaptation is below an ascender line of the translation.

5. The method of claim 2, wherein the selected adaptation is a replacement of an original word in the text string with a new word.

6. The method of claim 5, wherein the new word is a synonym of the original word.

7. The method of claim 2, wherein the selected adaptation is a change in the style of the text string or a portion of the text string.

8. The method of claim 2, wherein the selected adaptation is an increase in a width of the text string or a portion of the text string.

9. The method of claim 2, wherein the baseline clarity score of the text string is based on readability and/or identifiability of characters within the text string; and the baseline clarity score of the associated content is based on a readability and/or identifiability of characters within the translation.

10. The method of claim 9, wherein the baseline combined clarity score is determined, at least in part, using the formula:

$$scorecombined\_clarity = x * scorefirst\_clarity + y * scoresecond\_clarity;$$

wherein
scorecombined_clarity is the baseline combined clarity score;
x is a first weighted variable;
scorefirst_clarity is the baseline clarity score of the text string;
y is a second weighted variable; and
scoresecond_clarity is the baseline clarity score of the translation.

11. The method of claim 10, wherein x is not equal to y.

12. The method of claim 1, wherein the associated content is an image.

13. The method of claim 12, wherein the selected adaptation is a change of y-position of the text string or a portion of the text string.

14. The method of claim 12, wherein the selected adaptation is a replacement of an original word in the text string with a new word.

15. The method of claim 14, wherein the new word is a synonym of the original word.

16. The method of claim 12, wherein the selected adaptation is a change in the style of the text string or a portion of the text string.

17. The method of claim 12, wherein the baseline clarity score of the text string is based on a readability and/or identifiability of characters within the text string; and the baseline clarity score of the associated content is based on an identifiability of objects within the image.

18. The method of claim 17, wherein the baseline combined clarity score is determined, at least in part, using the formula:

$$scorecombined\_clarity = x * scorefirst\_clarity + y * scoresecond\_clarity;$$

wherein
scorecombined_clarity is the baseline combined clarity score;
x is a first weighted variable;
scorefirst_clarity is the baseline clarity score of the text string;
y is a second weighted variable; and
scoresecond_clarity is the baseline clarity score of the associated content.

19. The method of claim 18, wherein x is not equal to y.

20. The method of claim 12, wherein when a placement of the text string is entirely within a top half or bottom half of the image, the selected adaptation is increasing a width of a portion of the text string; and when the placement of the text string is entirely within a left half or right half of the image, the selected adaptation is increasing a height of a portion of the text string.

21. The method of claim 1, wherein the one or more candidate adaptations include at least one of:
increasing a width of a portion of the text string; and
increasing a height of a portion of the text string;
wherein
each candidate adaptation in the one or more candidate adaptations is unique.

22. The method of claim 21, further comprising:
defining a designated area on the electronic display, wherein
when the text string having the selected adaptation and the associated content are rendered, the text string having the selected adaptation does not protrude out of the designated area.

23. The method of claim 1, wherein a type of the selected adaptation is an output from a machine learning model.

24. A system configured to display a text string and associated content, the system comprising:
memory storing executable instructions; and
a processing device executing the executable instructions, wherein the executable instructions, when executed by the processing device, configure the system to:
receive, by the processing device, visual content data representing an associated content renderable into pixel values;
receive, by the processing device, a text string that overlaps an airspace of the associated content;
calculate, by a clarity scoring module, a baseline combined clarity score using one or more algorithms selected from a group comprising text readability algorithms and text identifiability algorithms, wherein the baseline combined clarity score is based on a baseline clarity score of the text string and a baseline clarity score of the associated content;
recreate, in a virtual environment, a representation of the text string and the associated content;
for each candidate adaptation in a set of one or more candidate adaptations to the text string:
apply, in the virtual environment, the candidate adaptation to the text string, wherein the text string having the candidate adaptation overlaps the airspace of the associated content;

calculate, by the clarity scoring module, a new combined clarity score using one or more algorithms selected from a group comprising text readability algorithms and text identifiability algorithms, wherein the new combined clarity score is based on a new clarity score of the text string having the candidate adaptation and a new clarity score of the associated content;
select, by the clarity scoring module, from the set of one or more candidate adaptations, a selected adaptation that yields a new combined clarity score greater than the baseline combined clarity score;
render, by a rendering module, the text string having the selected adaptation and the associated content; and
display, on an electronic display, the text string having the selected adaptation and the associated content.

25. A non-transitory computer-readable storage medium storing instructions that, when executed by one or more processors, cause the one or more processors to perform operations comprising:
receiving, by the one or more processors, visual content data representing an associated content renderable into pixel values;
receiving, by the one or more processors, a text string that overlaps an airspace of the associated content;
calculating, by a clarity scoring module, a baseline combined clarity score using one or more algorithms selected from a group comprising text readability algorithms and text identifiability algorithms, wherein the baseline combined clarity score is based on a baseline clarity score of the text string and a baseline clarity score of the associated content;
recreating, in a virtual environment, a representation of the text string and the associated content;
for each candidate adaptation in a set of one or more candidate adaptations to the text string:
applying, in the virtual environment, the candidate adaptation to the text string, wherein the text string having the candidate adaptation overlaps the airspace of the associated content;
calculating, by the clarity scoring module, a new combined clarity score using one or more algorithms selected from a group comprising text readability algorithms and text identifiability algorithms, wherein the new combined clarity score is based on a new clarity score of the text string having the candidate adaptation and a new clarity score of the associated content;
selecting, by the clarity scoring module, from the set of one or more candidate adaptations, a selected adaptation that yields a new combined clarity score greater than the baseline combined clarity score;
rendering, by a rendering module, the text string having the selected adaptation and the associated content; and
displaying, on an electronic display, the text string having the selected adaptation and the associated content.

* * * * *